Nov. 18, 1947.    J. P. LUDWIG    2,430,882
KNITTING MACHINE
Filed Dec. 20, 1944    19 Sheets-Sheet 1

INVENTOR:
Johannes Paul Ludwig,
BY Paul & Paul
ATTORNEYS.

Nov. 18, 1947.    J. P. LUDWIG    2,430,882
KNITTING MACHINE
Filed Dec. 20, 1944    19 Sheets-Sheet 3

INVENTOR:
Johannes Paul Ludwig,
BY Paul & Paul
ATTORNEYS.

Nov. 18, 1947.   J. P. LUDWIG   2,430,882
KNITTING MACHINE
Filed Dec. 20, 1944   19 Sheets-Sheet 4

INVENTOR:
Johannes Paul Ludwig
ATTORNEYS.

Nov. 18, 1947.  J. P. LUDWIG  2,430,882
KNITTING MACHINE
Filed Dec. 20, 1944   19 Sheets-Sheet 6
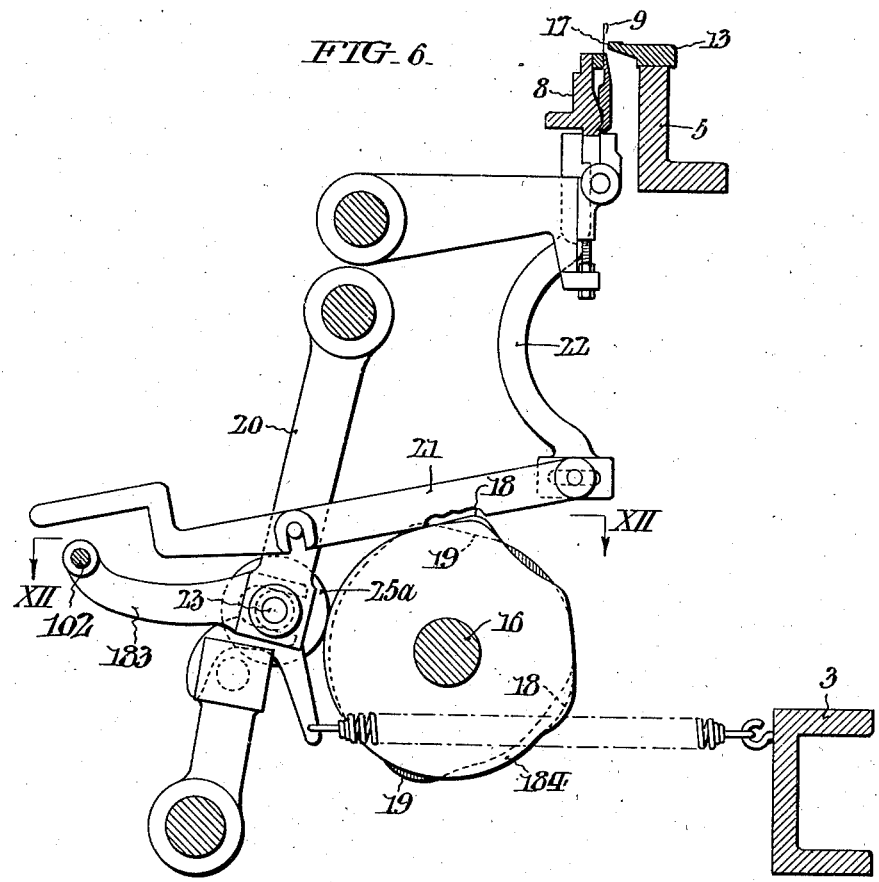
FIG. 6.
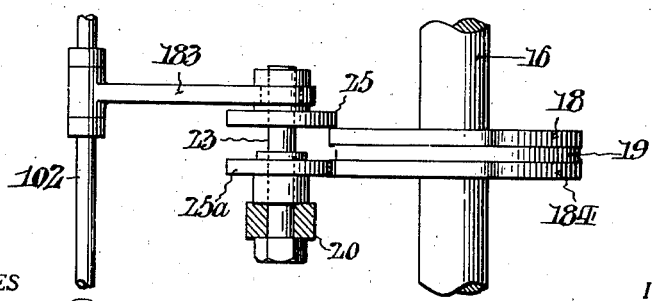
FIG. XII.
WITNESSES
INVENTOR:
Johannes Paul Ludwig,
BY
ATTORNEYS.

Nov. 18, 1947.  J. P. LUDWIG  2,430,882
KNITTING MACHINE
Filed Dec. 20, 1944  19 Sheets-Sheet 7
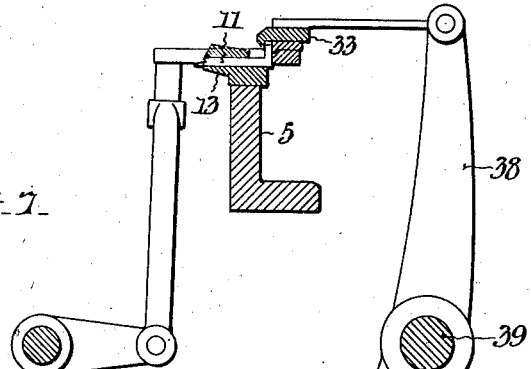
FIG. 7.
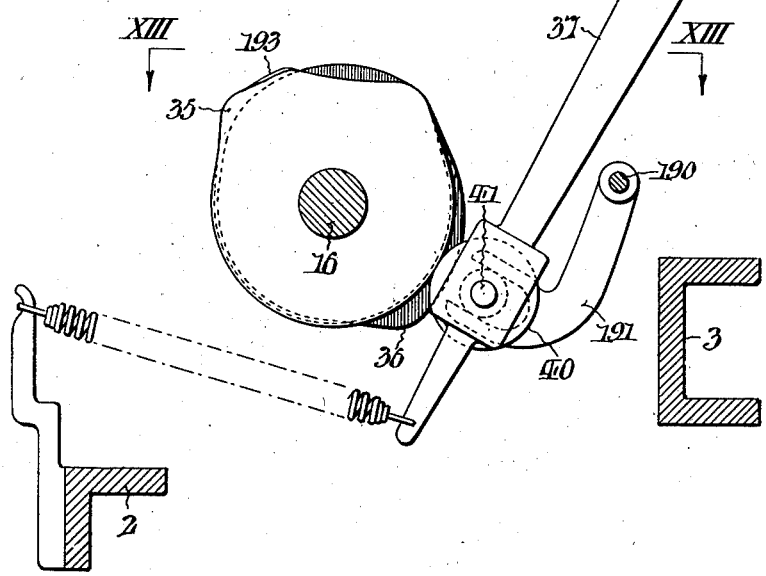
FIG. 13.
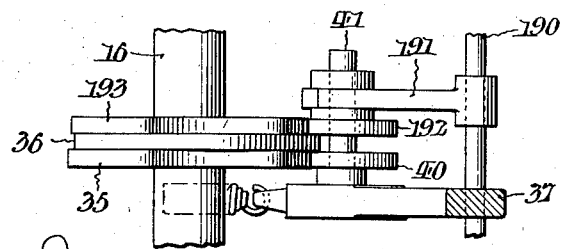
INVENTOR:
Johannes Paul Ludwig,
BY Paul & Paul
ATTORNEYS.

Nov. 18, 1947.  J. P. LUDWIG  2,430,882
KNITTING MACHINE
Filed Dec. 20, 1944   19 Sheets-Sheet 8
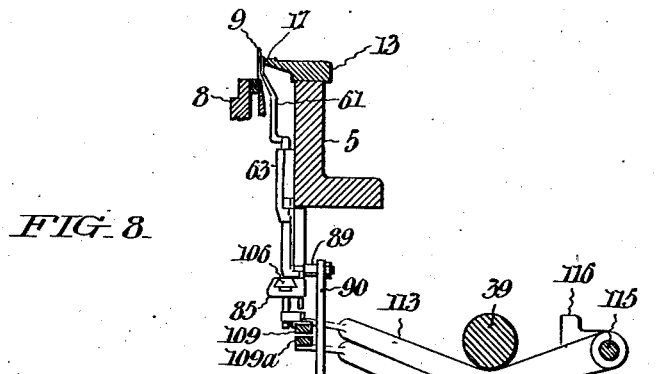
FIG. 8
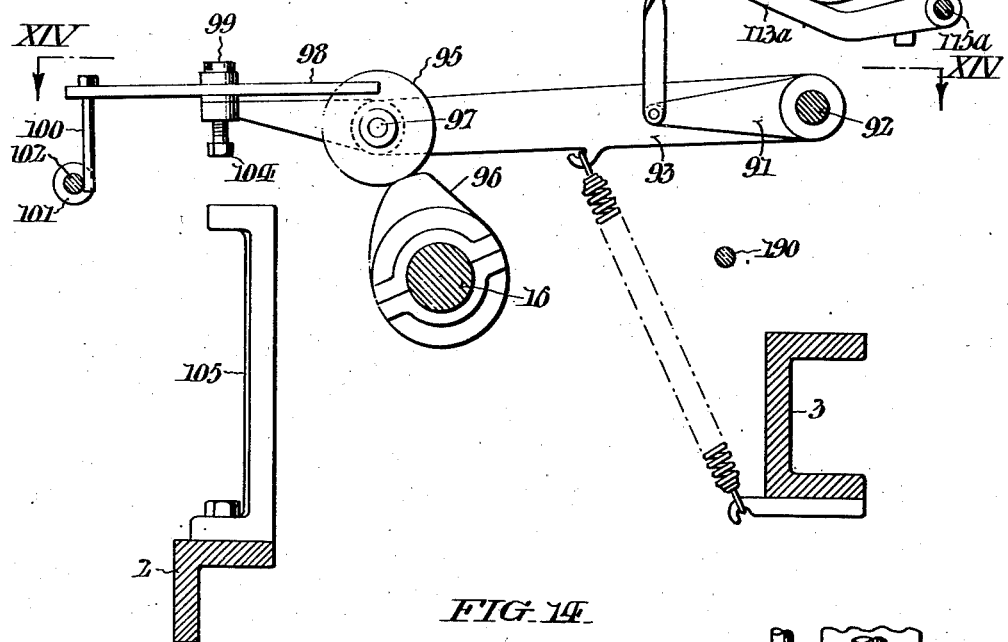
FIG. 14
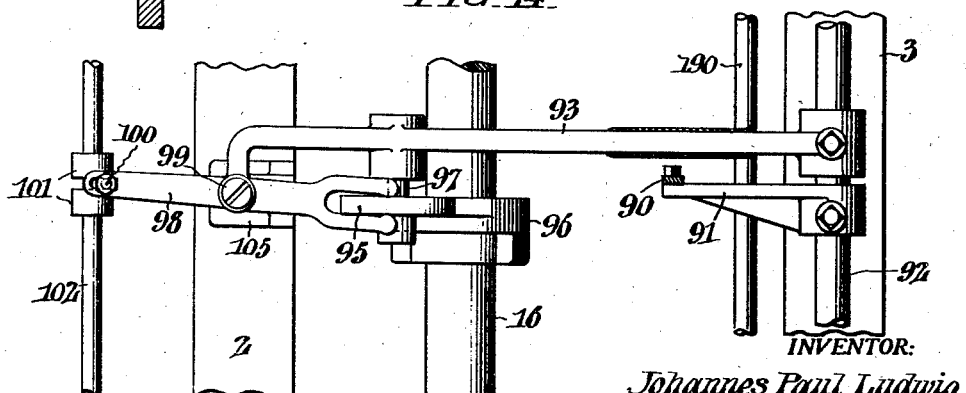
INVENTOR:
Johannes Paul Ludwig
BY Paul Paul
ATTORNEYS.

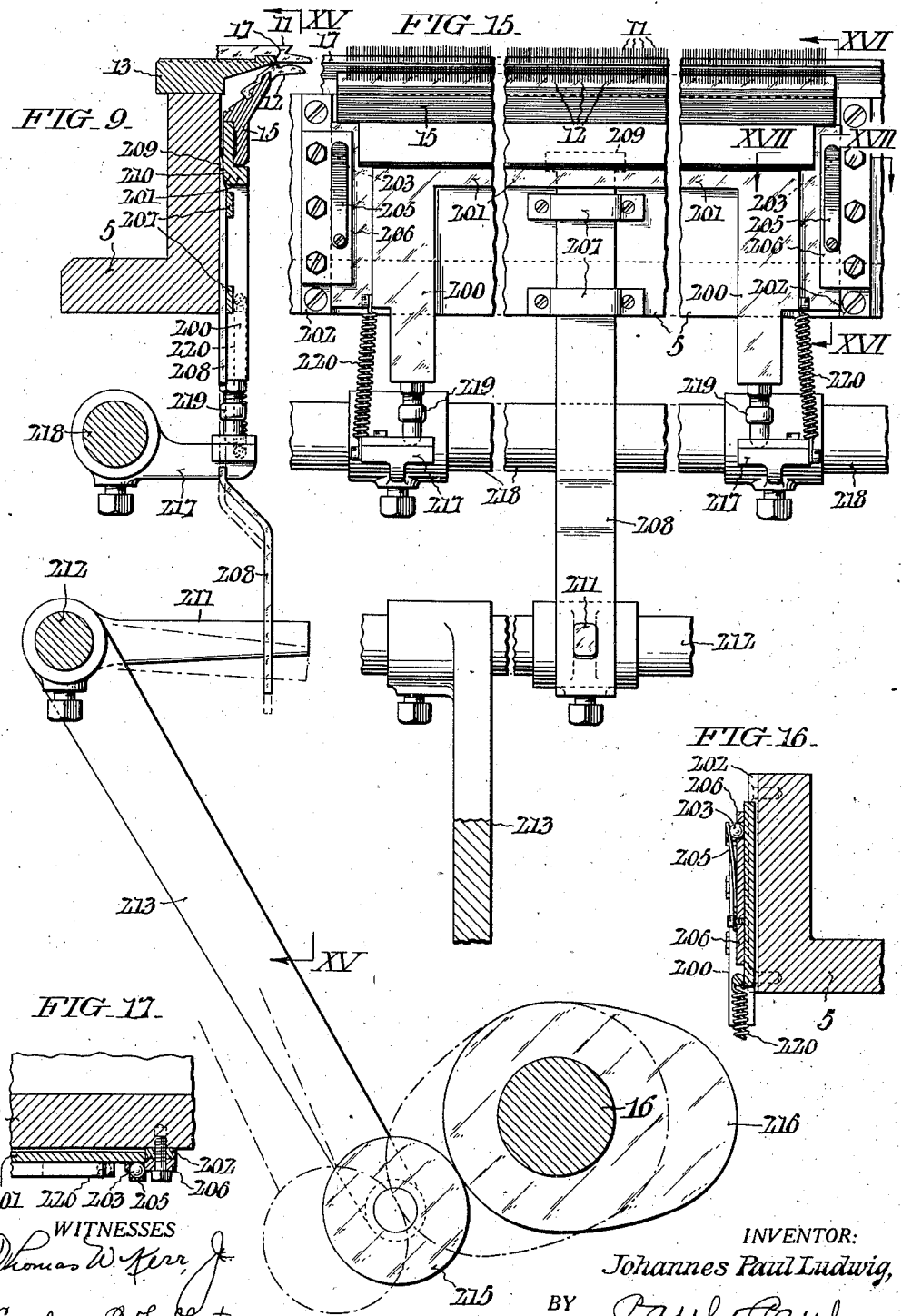

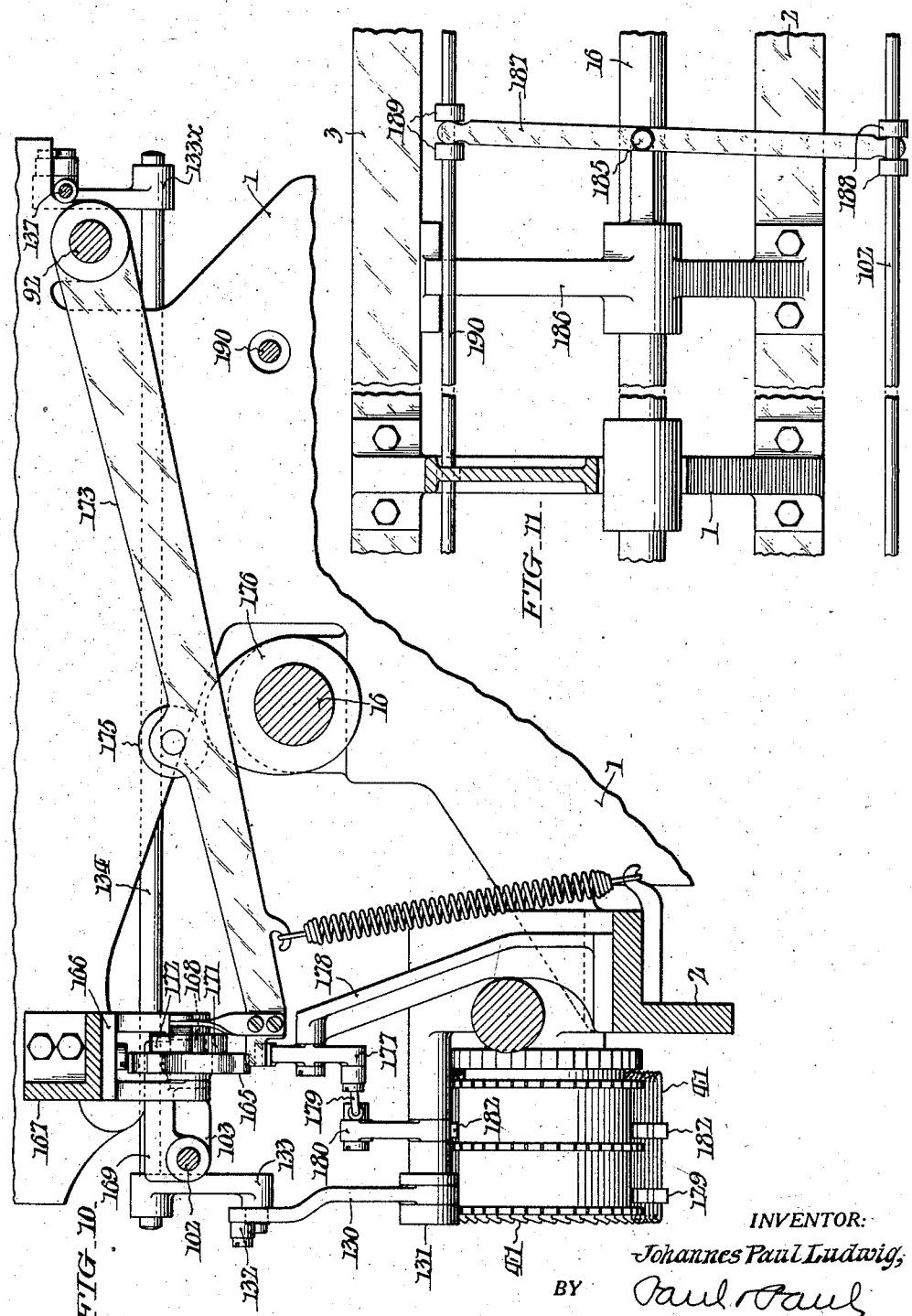

Nov. 18, 1947. J. P. LUDWIG 2,430,882
KNITTING MACHINE
Filed Dec. 20, 1944 19 Sheets-Sheet 11
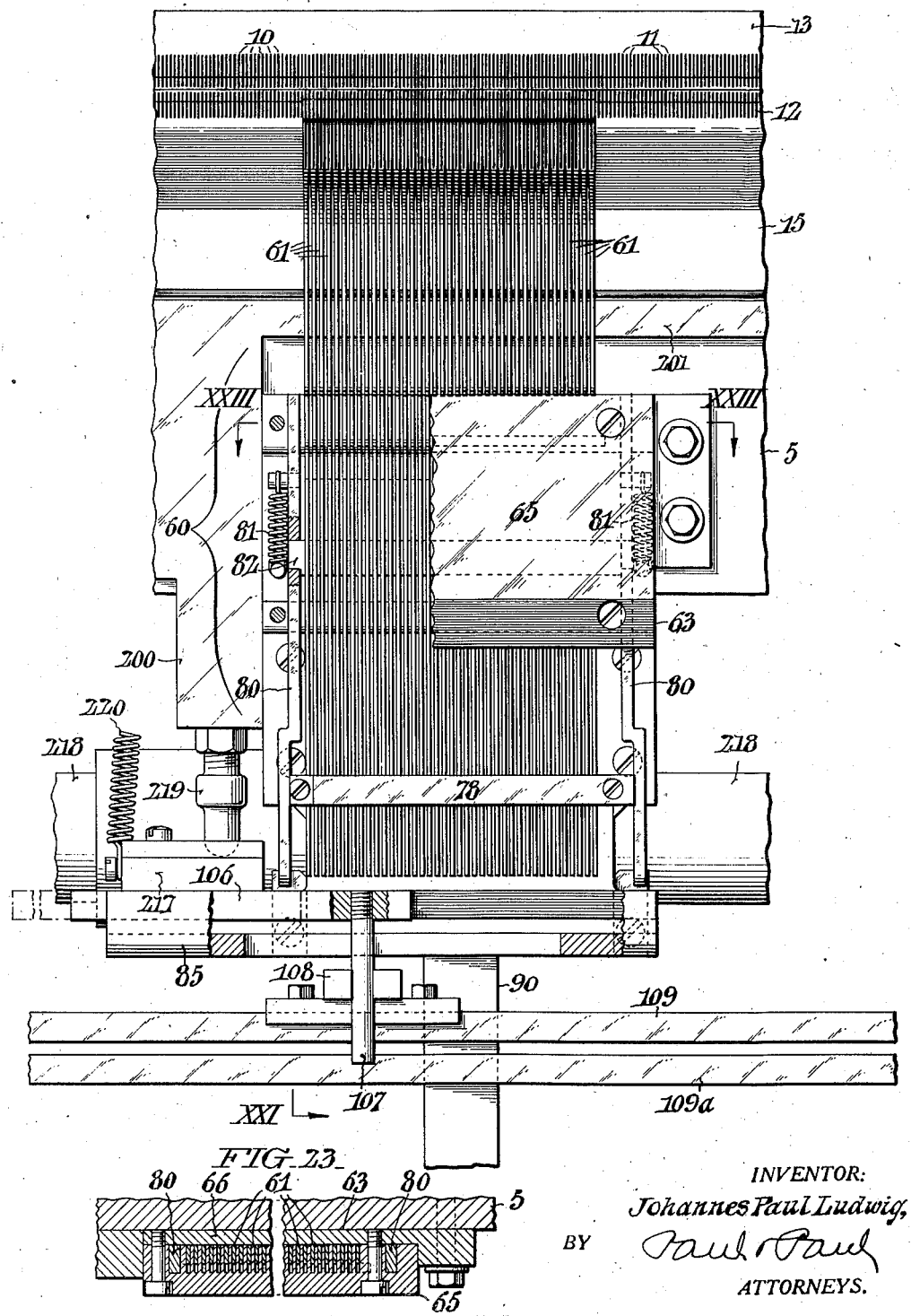
INVENTOR:
Johannes Paul Ludwig,
BY Paul & Paul
ATTORNEYS.

Nov. 18, 1947.   J. P. LUDWIG   2,430,882
KNITTING MACHINE
Filed Dec. 20, 1944   19 Sheets-Sheet 12
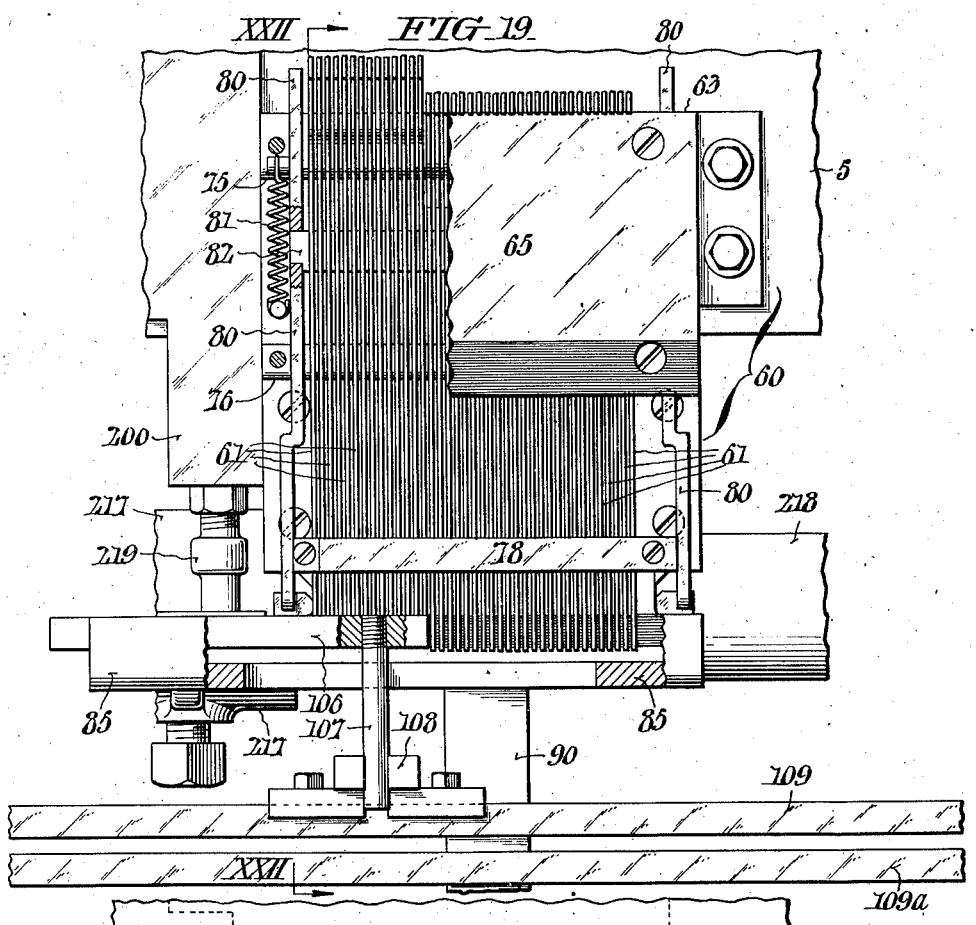
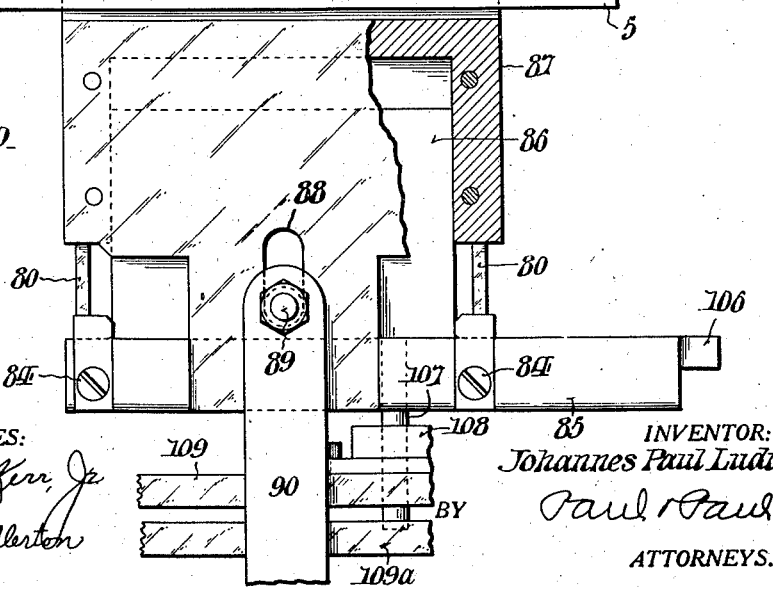
WITNESSES:
Thomas W. Kerr, Jr.
Evalyn L. Fullerton
INVENTOR:
Johannes Paul Ludwig,
BY Paul & Paul
ATTORNEYS.

Nov. 18, 1947.  J. P. LUDWIG  2,430,882
KNITTING MACHINE
Filed Dec. 20, 1944  19 Sheets-Sheet 13
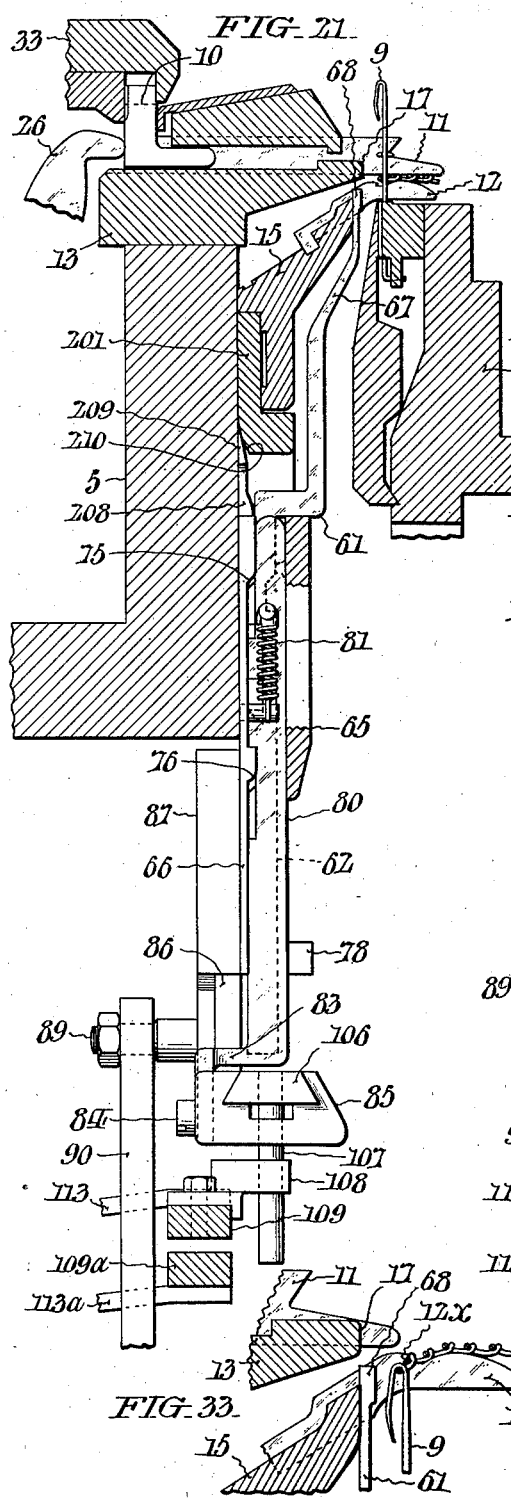
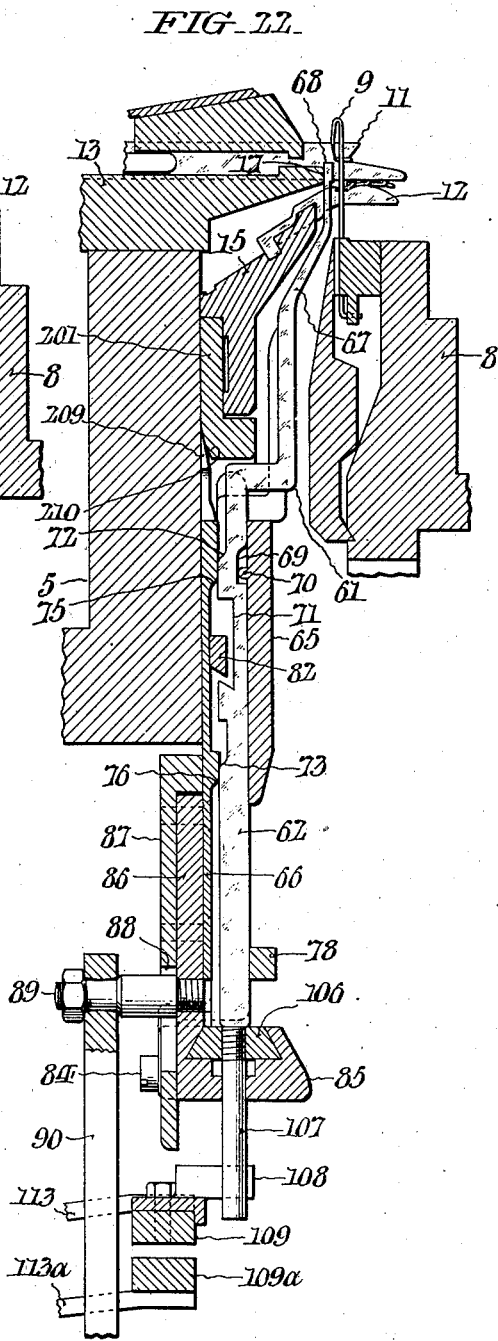
INVENTOR:
Johannes Paul Ludwig,
BY
ATTORNEYS.

Nov. 18, 1947.   J. P. LUDWIG   2,430,882
KNITTING MACHINE
Filed Dec. 20, 1944   19 Sheets-Sheet 14
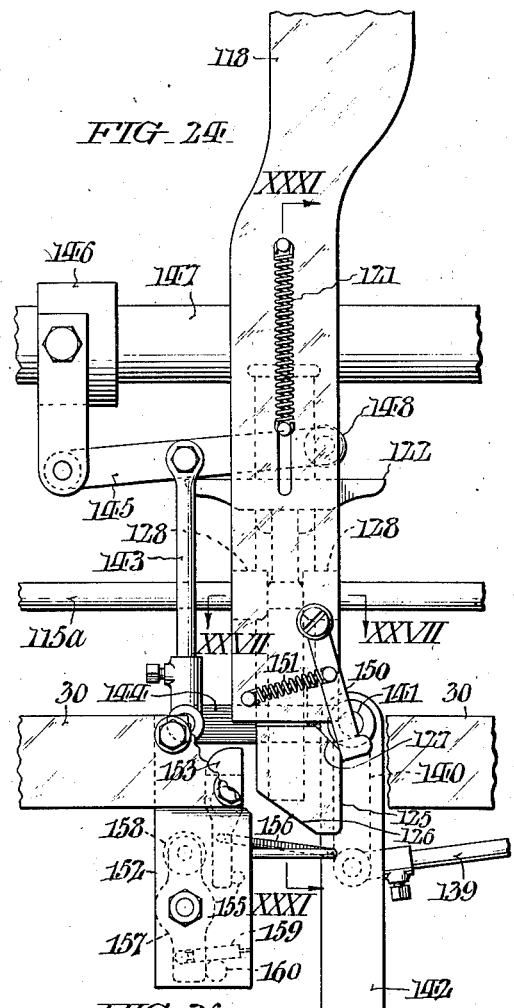
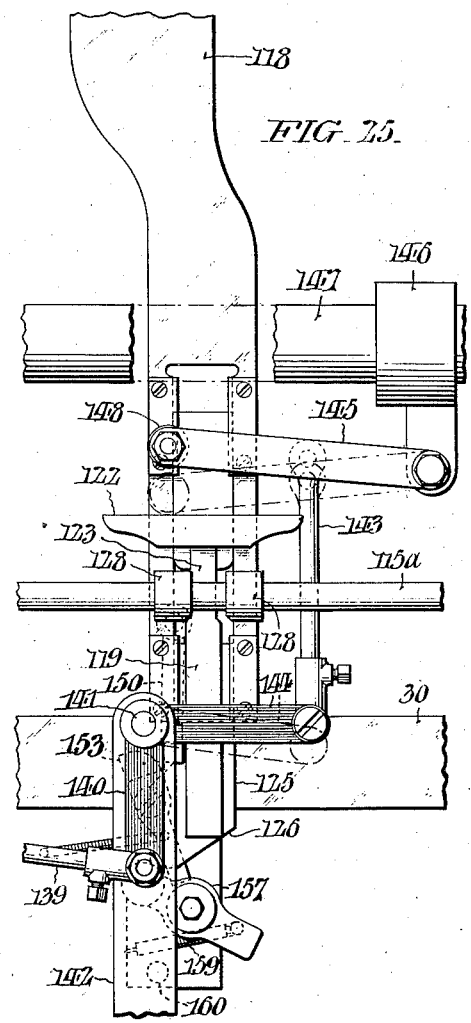
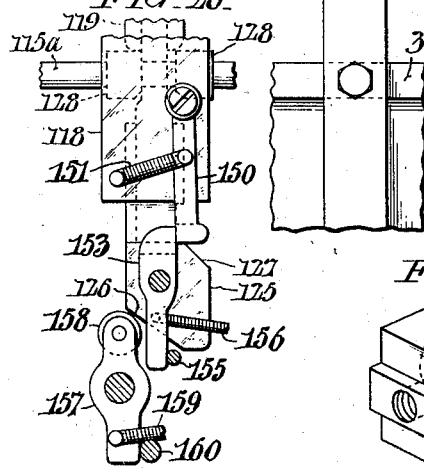
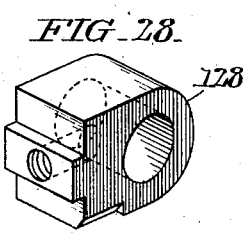
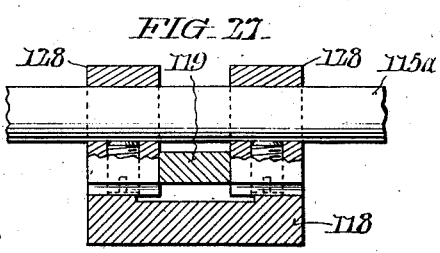
INVENTOR:
Johannes Paul Ludwig,
BY Paul & Paul
ATTORNEYS.

Nov. 18, 1947.  J. P. LUDWIG  2,430,882
KNITTING MACHINE
Filed Dec. 20, 1944  19 Sheets-Sheet 15
FIG. 29.  FIG. 30.
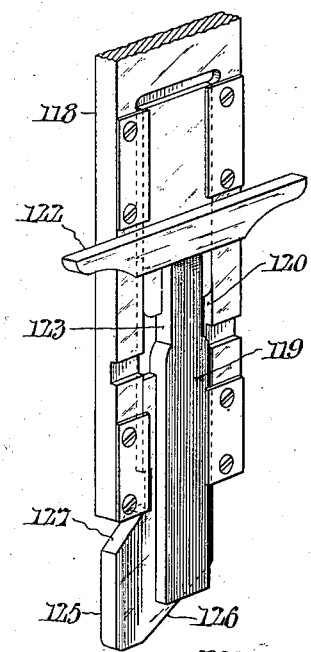
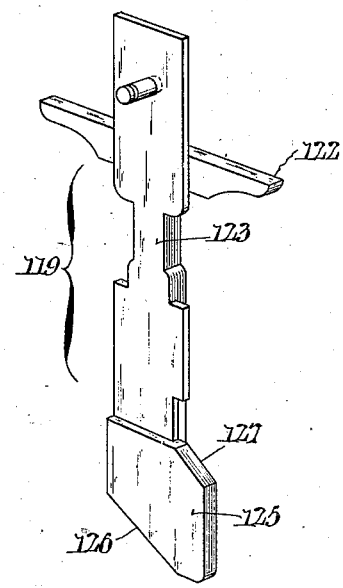
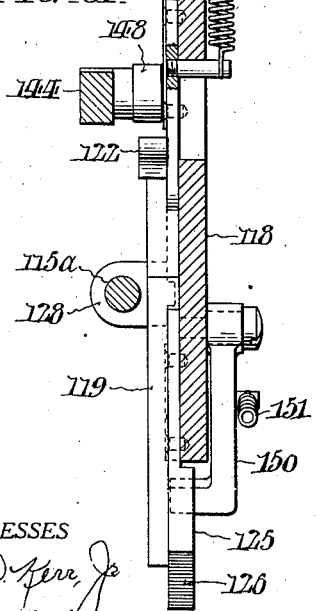
FIG. 31.
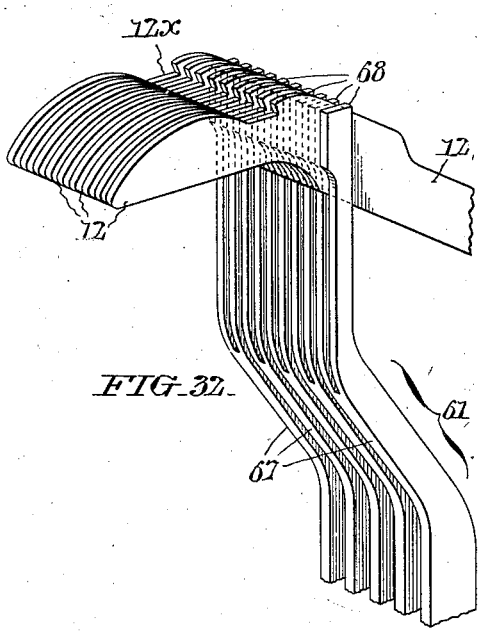
FIG. 32.
WITNESSES
Thomas W. Kerr, Jr.
Evalyn L. Fullerton
INVENTOR:
Johannes Paul Ludwig,
BY Paul & Paul
ATTORNEYS.

Nov. 18, 1947.   J. P. LUDWIG   2,430,882
KNITTING MACHINE
Filed Dec. 20, 1944   19 Sheets-Sheet 16
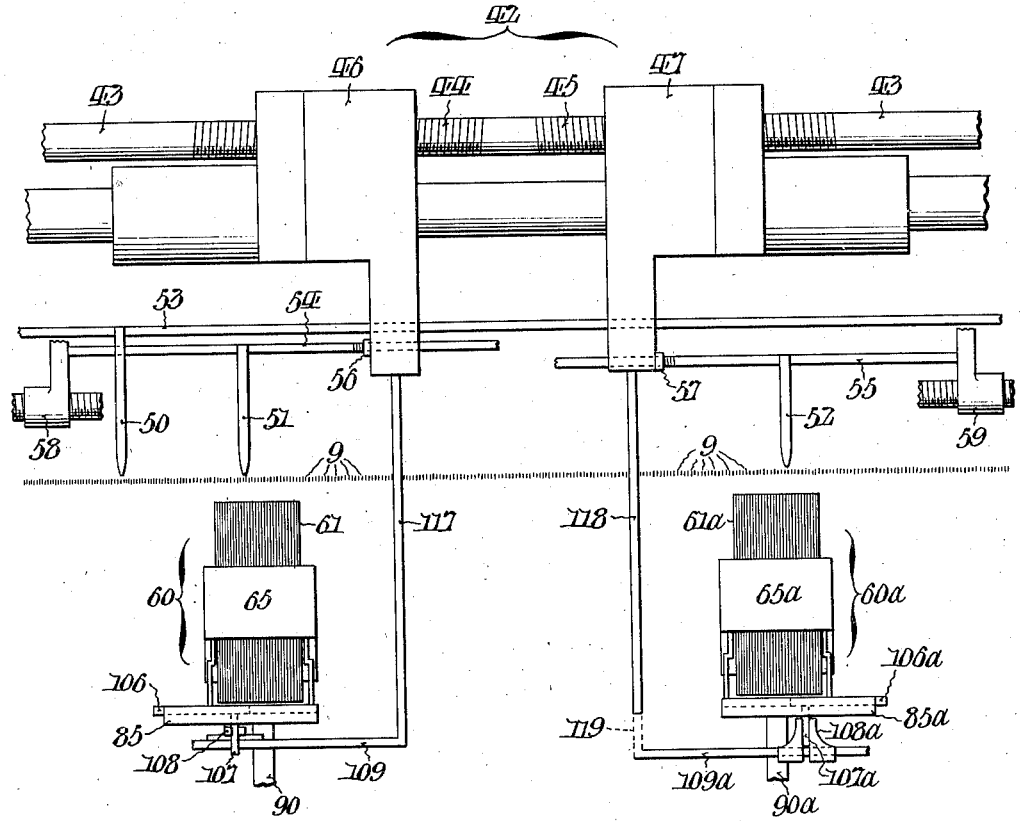
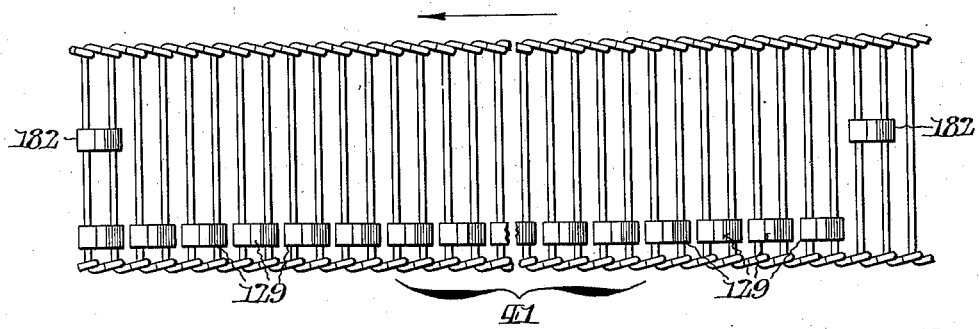
WITNESSES
INVENTOR:
Johannes Paul Ludwig,
BY
ATTORNEYS.

Nov. 18, 1947.  J. P. LUDWIG  2,430,882
KNITTING MACHINE
Filed Dec. 20, 1944   19 Sheets-Sheet 17
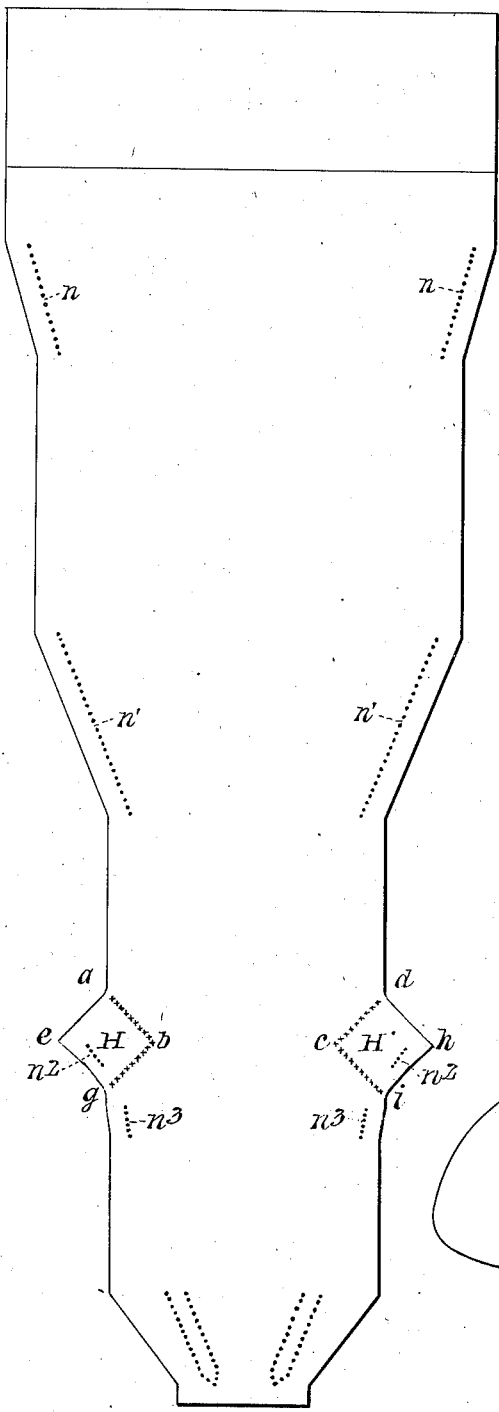
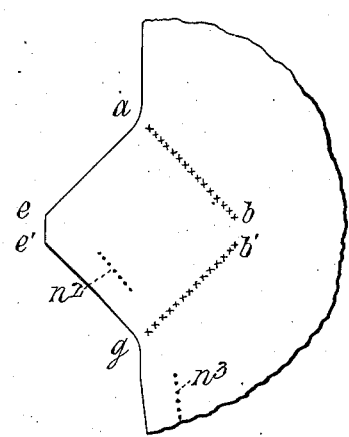
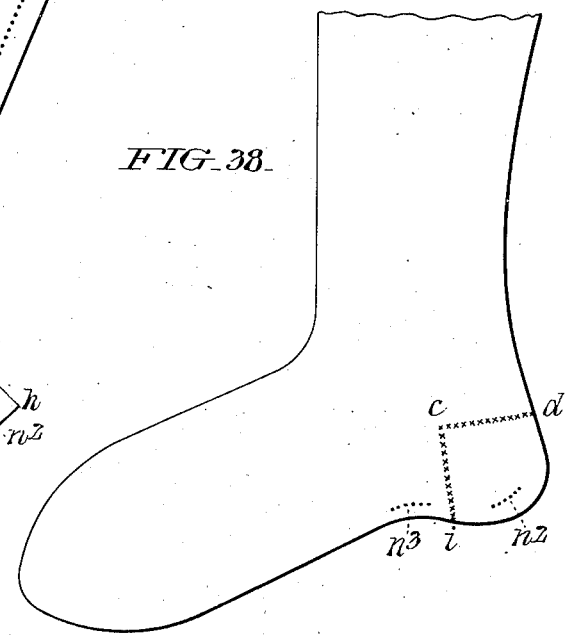
INVENTOR:
Johannes Paul Ludwig,
BY Paul & Paul
ATTORNEYS.

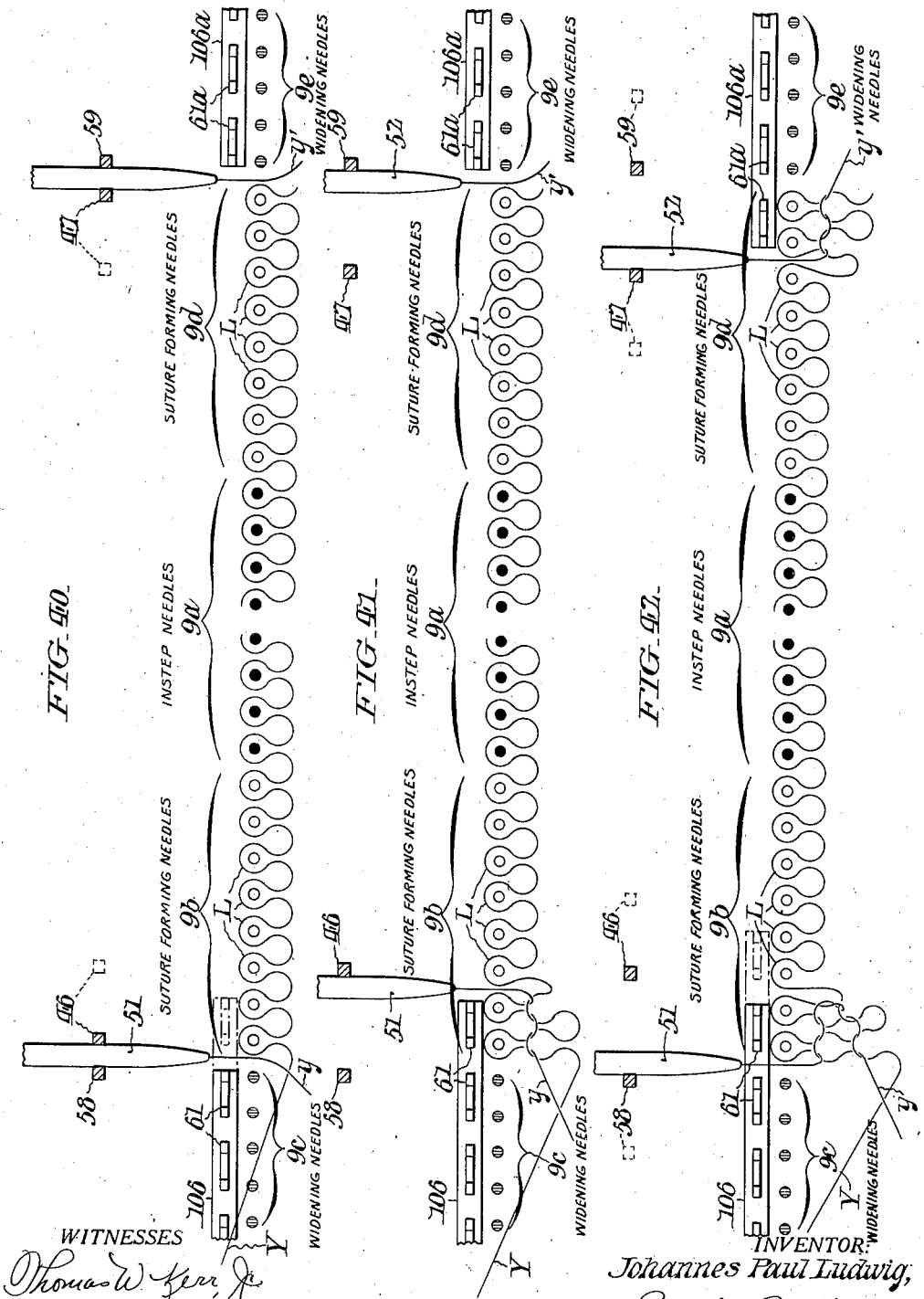

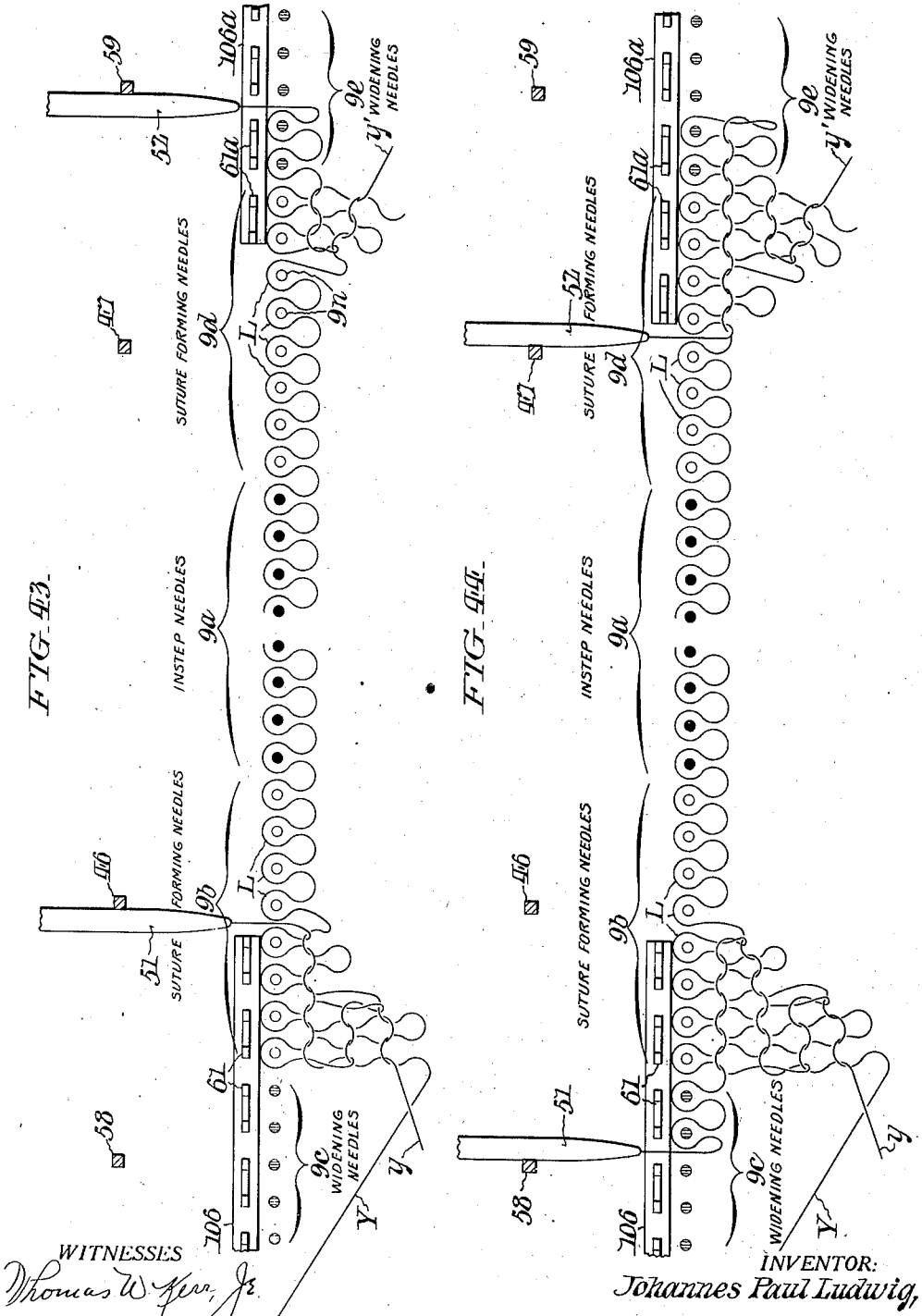

Patented Nov. 18, 1947

2,430,882

UNITED STATES PATENT OFFICE 2,430,882

KNITTING MACHINE

Johannes Paul Ludwig, Milwaukee, Wis., assignor to Phoenix Hosiery Company, Milwaukee, Wis., a corporation of Wisconsin Application December 20, 1944, Serial No. 568,959

19 Claims. (Cl. 66—89)

This invention relates to straight knitting machines. More specifically it is concerned with knitting machines of the "Cotton" type ordinarily employed in the manufacture of full fashion hosiery.

The chief aim of my invention is to make it possible to economically produce on such machines integrally knitted stocking blanks of the kind disclosed in U. S. Patent No. 2,003,189, granted to Woldemar Heinitz on May 28, 1935, characterized by having cheek gussets of substantially square configuration wedgedly interposed between the ankle and foot portions and defined by gores or sutures which extend substantially at right angles to each other.

This desideratum is realized in practice, as hereinafter more fully set forth, through provision of an improved supplemental heel knitting means which is simple in construction and reliable in operation; which can be readily incorporated in existant straight knitting machines initially designed for the producing of stocking leg blanks only, at relatively small cost without requiring any structural changes in the machines or interfering with their normal mode of operation; and which includes mechanism for selecting auxiliary presser elements corresponding to needles of two end groups of heel needles first in gradually increasing numbers both inwardly and outwardly of the selvage edges of the blank and later in progressively decreasing numbers respectively to cause knitting by such needles of yarns taken from two different carriers in forming the heel cheeks, and for concurrently varying the traverse of the carriers correspondingly as required, while a central group of instep needles between the two groups of heel needles operates idly but retains its loops during the heel cheek knitting.

Other objects and advantages will appear from the following detailed description of the attached drawings, wherein Fig. 1 is a fragmentary view partly in front elevation and partly in vertical section of a straight knitting machine conveniently embodying the present improvements.

Figs. 5, 6, 7, 8 and 9 are cross sectional views of the machine taken in different transverse planes.

Fig. 10 is a fragmentary sectional view taken as indicated by the angled arrows X—X in Fig. 2.

Fig. 11 is a fragmentary view in horizontal section taken as indicated by the angled arrows XI—XI of Fig. 5.

Figs. 12, 13 and 14 are horizontal sectional views taken as indicated respectively by the angled arrows XII—XII, XIII—XIII and XIV—XIV in Figs. 6, 7 and 8.

Fig. 15 is a broken out view in vertical section taken as indicated by the angled arrows XV—XV in Fig. 9.

Figs. 16 and 17 are fragmentary detail sectional views taken as indicated respectively by the angled arrows XVI—XVI and XVII—XVII in Fig. 15.

Fig. 18 is a fragmentary view in front elevation showing one of the unit devices for controlling knitting by one of the two groups of needles used in forming the heel pockets of stockings in accordance with my invention, with the component parts of said unit in their normal or inactive positions.

Fig. 19 is a view corresponding to Fig. 18 showing the unit of Fig. 18 in operative condition.

Fig. 20 is a broken out view of the unit of Figs. 18 and 19 partly in rear elevation and partly in section.

Fig. 21 is a fragmentary cross sectional view taken as indicated by the angled arrows XXI—XXI in Fig. 18.

Fig. 22 is a cross sectional view taken as indicated by the angled arrows XXII—XXII in Fig. 19.

Fig. 23 is a fragmentary detail view taken as indicated by the angled arrows XXIII—XXIII in Fig. 18.

Fig. 24 is a fragmentary view in rear elevation corresponding to Fig. 3 showing the means by which the unit of Fig. 18 is controlled, said means being illustrated in normal or inoperative position.

Fig. 25 is a fragmentary view of a control means as it appears when viewed from the front or the side opposite to that from which Fig. 24 is observed but with the means in operative position.

Fig. 26 is a fragmentary view corresponding to Fig. 24 with the parts differently positioned.

Fig. 27 is a fragmentary sectional view taken as indicated by the angled arrows XXVII—XXVII in Fig. 24.

Fig. 28 is a detail view in perspective of one of the elements of the control means.

Fig. 29 is a fragmentary view in perspective of certain parts of the control means.

Fig. 30 is a perspective view of another element of the control means.

Fig. 31 is a detail sectional view taken as indicated by the angled arrows XXXI—XXXI in Fig. 24.

Fig. 32 is a perspective view showing the relationship between the knock-overs of the machine and a number of associated auxiliary needle beard presser elements included in one of the units.

Fig. 33 is a fragmentary view in cross section also showing the relationship between the knock-overs and the auxiliary presser elements.

Fig. 34 is a fragmentary detail view looking as indicated by the angled arrows XXXIV—XXXIV in Fig. 1.

Fig. 35 is a fragmentary diagrammatic view of the machine corresponding generally to Fig. 1.

Fig. 36 is a detail view in plan showing a portion of the timing chain of the machine.

Fig. 37 is a view showing a stocking blank such as may be produced in the machine.

Fig. 38 is a fragmentary view in side elevation of a stocking formed from the blank of Fig. 37.

Fig. 39 is a fragmentary view on a larger scale showing an alternative form of heel cheek; and Figs. 40–44 are diagrammatic views showing successive steps in the formation of the heel cheeks.

Figure 1:
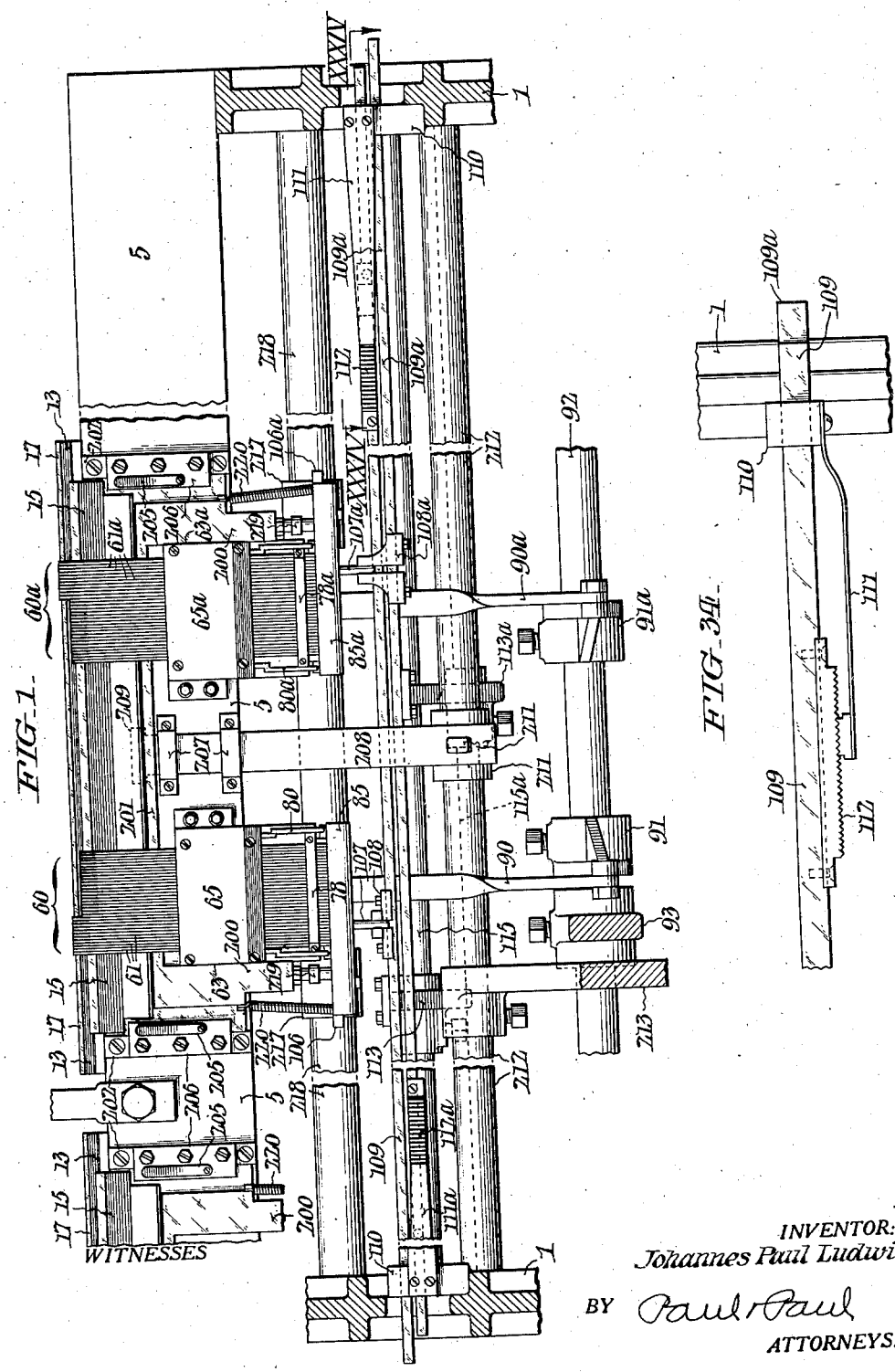
Figure 2:
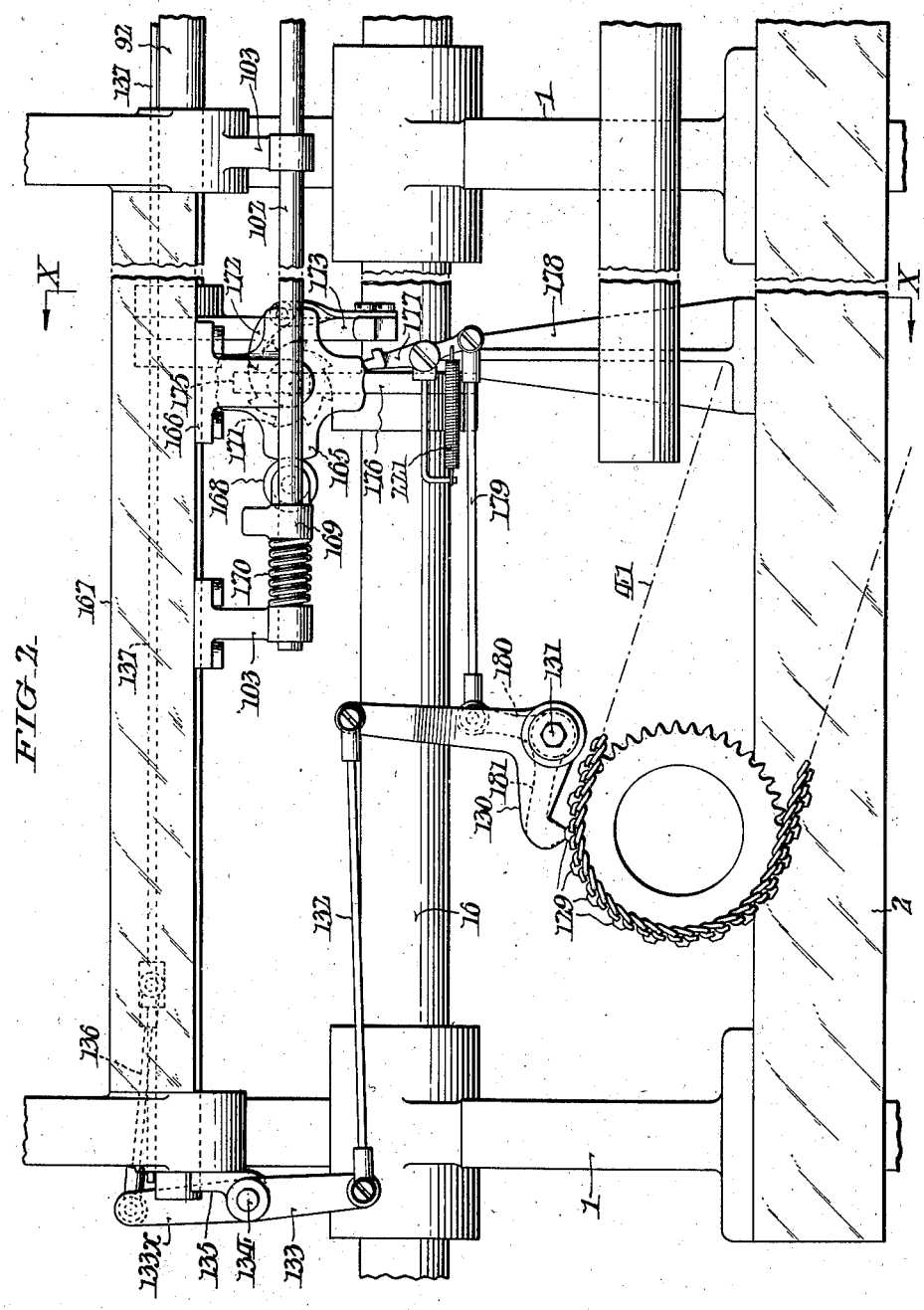
Fig. 2 is a fragmentary view in front elevation of the left-hand end of the machine drawn to a larger scale.
Figure 3:
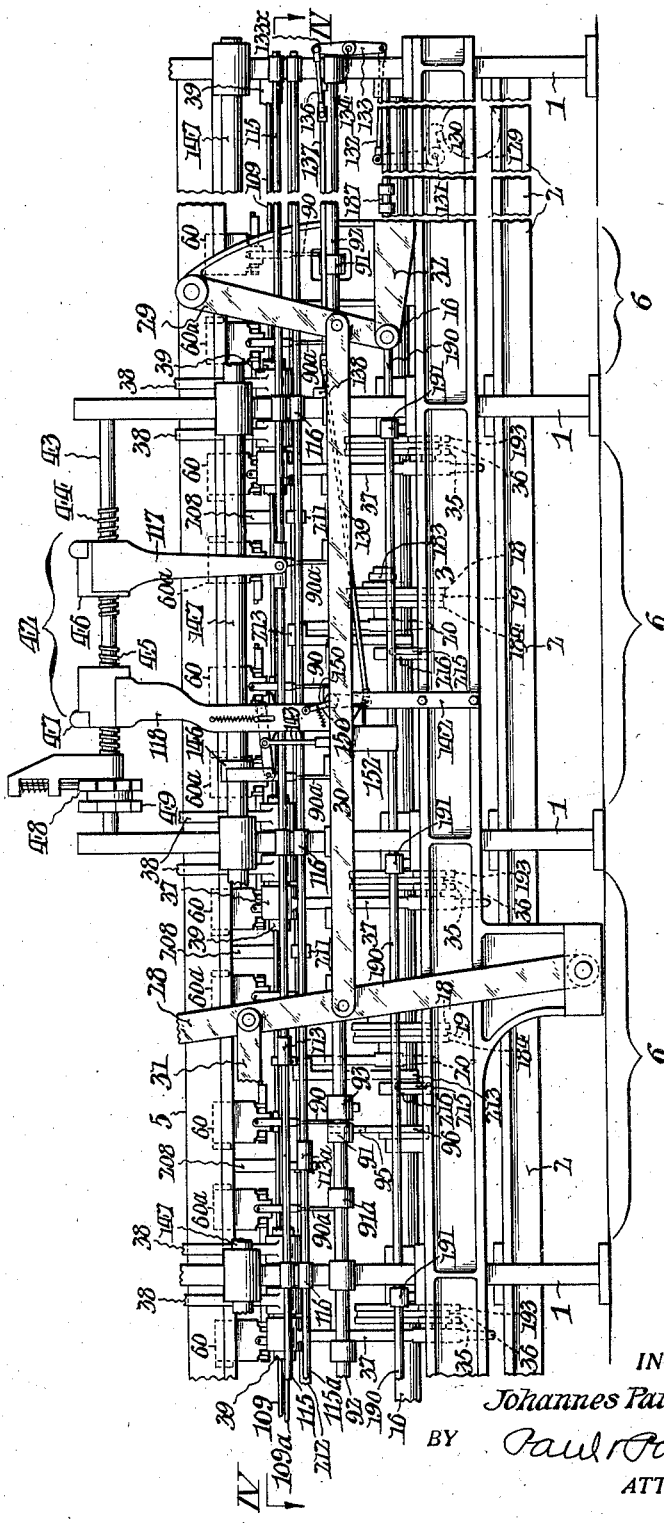
Fig. 3 is a fragmentary view showing part of the machine in rear elevation.
Figure 4:
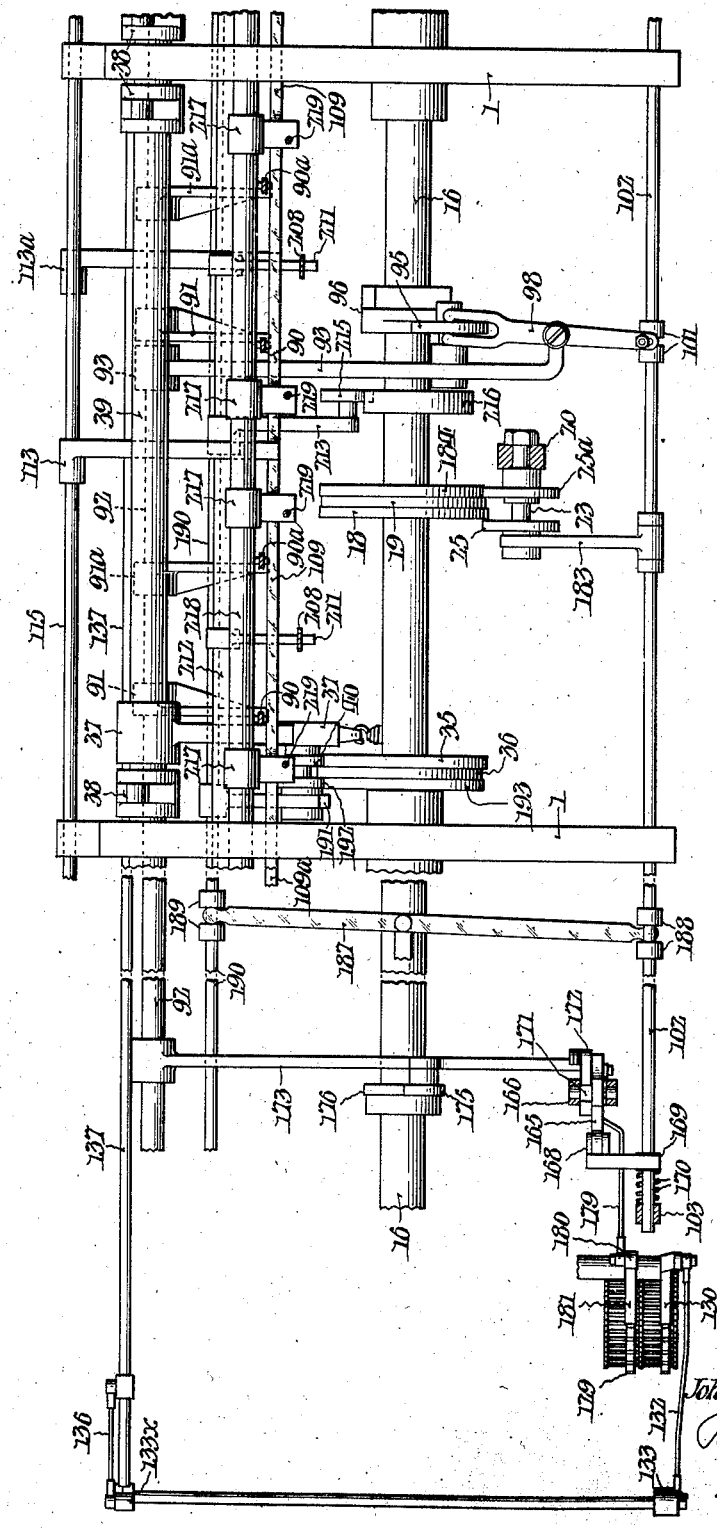
Fig. 4 is a fragmentary plan view of the machine taken as indicated by the angled arrows IV—IV in Fig. 3.
Figure 5:
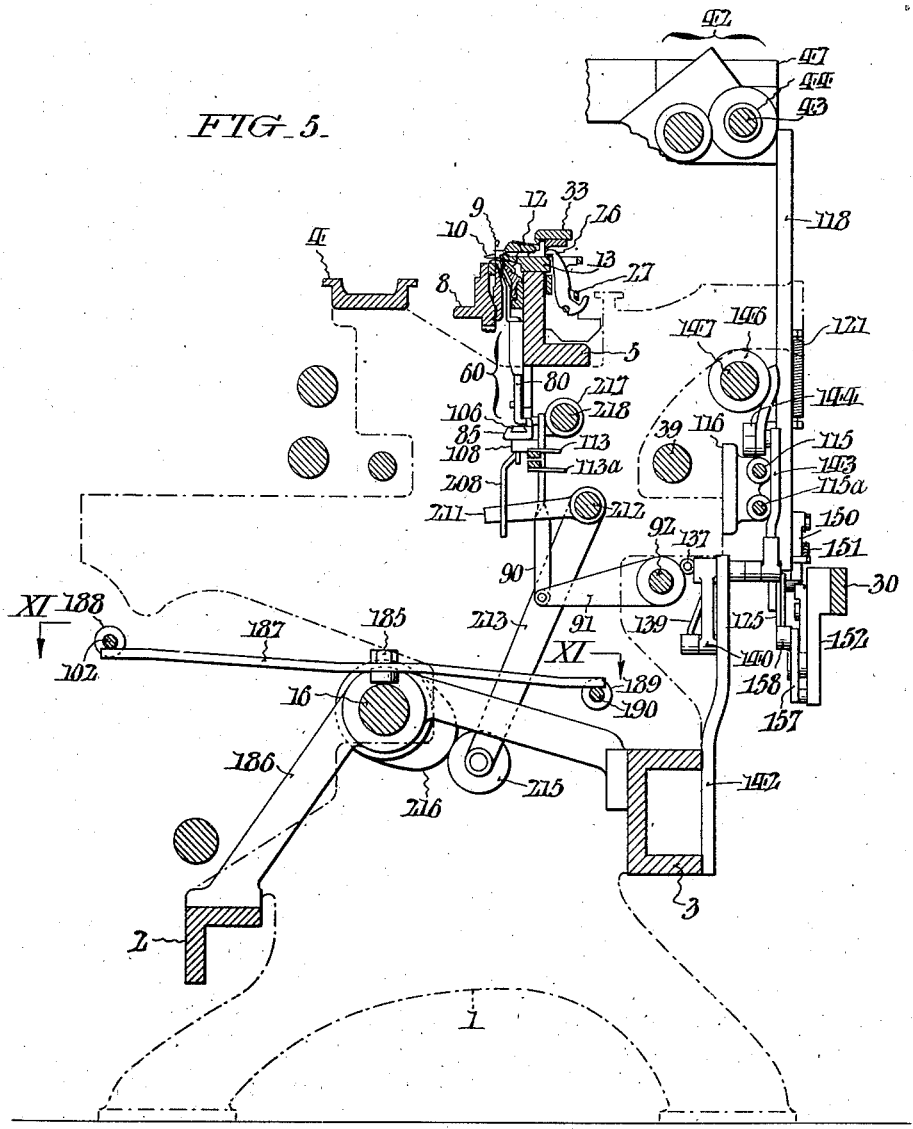

The knitting machine chosen for convenience of exemplification herein is generally of standard construction in that it has a plurality of spaced transverse frames 1 (Figs. 1, 3 and 5) which are joined by horizontally extending rail members including a front beam 2, a rear beam 3, a front bed 4 and a center bed 5 (Fig. 5), and which set apart individual knitting sections respectively designated comprehensively by the numeral 6 (Fig. 3). In each knitting section is a movable bar 8 which carries a bank of vertically-arranged needles 9; and cooperative with the needles are individually associated sinkers 10, dividers 11 and knock-overs 12, the sinkers and dividers being horizontally slidable as usual in a fixed supporting head 13 on the center bed 5 and the knock-overs being mounted in a separate head 15. Through suitable interposed connections (not shown) the needle bar 8 is raised and lowered by rotary cams (not shown) on a longitudinally extending cam shaft 16 capable of being shifted endwise for cam substitutions incident to fashioning operations in a well known way. In-and-out or press movements are induced in the needle bar 8 as ordinarily to bring the needle beards into contact with the presser ledge 17 on the sinker head 13 by a rotary main press cam 18 and a substitute press cam 19 (used in the narrowing phases) on the cam shaft 16 (Figs. 4, 6 and 12) through a system of levers 20, 21 and 22, the lever 20 carrying a pin 23 whereon is mounted a roller 25 designed to roll on said cams. As usual, the sinkers 10 are advanced through pivoted jacks 26 operated by a slur cock on a horizontal bar 27 which is reciprocated endwise through parts (not shown) by the couliering mechanism of the machine. The oscillating levers and connecting links of this couliering mechanism are illustrated in Fig. 3 and designated by the numerals 28, 29, 30, 31 and 32 respectively. The dividers 11 are advanced subsequent to the projection of the sinkers 10 by a catch bar 33 (Fig. 7), which, after the yarn sinking, likewise operates as ordinarily to subsequently withdraw said sinkers and dividers en masse. The necessary movements for this purpose are customarily imparted to the catch bar 33 by a main rotary cam 35 and a supplemental rotary cam 36 (used in the narrowing phases) on the cam shaft 16 through the medium of levers 37 and 38 on a rock shaft 39, the lever 37 carrying a roller 40 arranged to roll on said cams. The machine is moreover equipped, as usual, with an intermittently-progressed chain 41 (Figs. 2, 4 and 10) which is relied upon to time and to control the various mechanisms of the machine during each knitting cycle, as well as with a "pointex" attachment which is generally designated by the numeral 42 in Figs. 3 and 35. The shaft 43 of this attachment has the usual oppositely-threaded portions 44, 45 engaged by nuts 46, 47 which are ordinarily used to variantly limit the traverse of the bars for the carriers feeding auxiliary yarns incident to formation, for example, of tapered reinforced areas above the heel tabs of the stocking. Affixed to the screw shaft 43 are forward and reverse ratchet wheels 48 and 49 which are selectively actuated under the control of the timing chain 41 through suitable pawling mechanism (not shown) which derives its movements from other cams (not shown) on the cam shaft 16.

In diagrammatic Fig. 35 there are illustrated at 50, 51 and 52 three of the yarn carriers of the machine, the latter two of which carriers I employ in the formation of the heel cheeks of the stockings, said carriers being respectively secured to usual endwise shaftable carrier bars 53, 54 and 55. The inward movement of the heel yarn carriers 51 and 52 is limited through engagement of stops 56, 57 thereon with the nuts 46, 47 of the "pointex" attachment 42, and their outward movement by the stop nuts 58, 59 of the usual narrowing mechanisms at the opposite ends of the machine.

In order to adapt a flat stocking knitting machine, such as above briefly described, to the purposes of my invention, I provide in association with each bank of needles 9 two auxiliary devices 60 and 60a respectively comprising groups of needle beard presser elements 61 and 61a designed to cooperate with corresponding groups of heel knitting needles adjacent opposite ends of each series 9. Except for being rights and lefts, the devices 60 and 60a are identical. Accordingly, the explanations which immediately follow of the left-hand one will hold for the right-hand one also; and, in order to preclude the necessity for repetitive description, all corresponding parts of the right-hand one will be identified by the numbers used for the identification of those of the left-hand one except for the addition in each instance of the letter "a" for convenience of more ready distinction. Referring again to the drawings, the presser elements 61 are in the form of bits struck from plate metal of a thickness equal to the span of two adjacent needles 9, and are restricted generally to vertical movement by reason of having their lower or shank end portions 62 confined in a retaining housing 63 bolted to the front face of the center bed 5 of the machine, the upper front cover plate 65 of said housing being removable and having vertical slots for individually guiding said bits, see Figs. 18 and 23. If desired, or found more convenient in practice, the front plate 65 may be made plain and the guide slots formed in the rear wall 66 of the housing 63. Each presser bit 61 has its upper end portion 67 outwardly offset to clear the knock-over bar 15 and terminating at the top in a small head 68 which is split to clear an intervening knock-over 12 with consequent provision of abutment faces for engagement by heel needles immediately adjacent opposite sides of such knock-over. At the front edge of its shank portion 62 each presser bit 61 has a beveled notch 69 (Fig. 22) to coact with a transverse cam ridge 70 on the front wall 65 of the housing 63. At its rear edge each presser bit 61 is moreover provided with a beveled notch 71, and with beveled cam shoulders at 72 and 73 which are adapted to coact respectively with beveled cam shoulders 75 and 76 on the back wall 66 of said housing as later on explained. A bar 78 extending across the front of the lower part of the housing 63 serves as a means for steadying the bits 61 in their movements as well as a supplementary means for assisting in their retainment. Slidable up and down in the opposite ends of the housing 63 are bars 80 each of which is biased downwardly by a spring 81 (Figs. 18 and 21) and which, near their upper ends, are connected by a cross bar 82 whereof the lower edge is beveled and adapted to coact with the beveled notches 71 in the rear edges of the presser bits 61. The bars 80 are offset rearwardly at their lower ends as at 83 and secured by screws 84 to a horizontal flange 85 at the bottom of a slide plate 86 which is movable up and down in a guide 87 secured to the rear of the pendent portion of the back wall 66 of the housing 63. Projecting rearwardly from the slide 86 through a clearance slot 88 (see Figs. 20-22) in the guide 87 is a stud 89, which, through a link 90 is connected to a lever 91 (Figs. 8 and 14) on a horizontal rock shaft 92. Also affixed to the rock shaft 92 is a spring-pulled arm 93 with a roller 95 adjacent its outer end adapted to be engaged by another rotary cam 96 on the cam shaft 16. The roller 95 is normally out of the range of the cam 96 being shiftable on its supporting stud 97 by a forked lever 98 which is medially pivoted on a stud 99 at the outer end of the arm 93. A pendent pin 100 on the lever 98 is engaged between a pair of collars 101 on a control rod 102 slidably supported by bearings 103 on the machine framework at the front (Fig. 2). As shown, the roller arm 93 carries a set screw 104 arranged to contact with a stop post 105 bolted to the beam 2 of the machine framework. By this means, the arm 93 is normally supported when the roller 95 is shifted beyond the cam 96.

Variant selection of the presser bits 61 is effected by means of an underlying slide 106 confined to a horizontal dovetail groove in the flange 85 of the vertically shiftable plate 86. As shown, the selecting slide has a stud 107 extending down through a longitudinal slot in the flange into a clevised lug 108 on a longitudinally-extending bar 109 which is shiftable endwise in guides 110 attached to the machine framework, being held against accidental displacement in shifted positions by a spring detent 111 (Figs. 1 and 34) which coacts with a saw tooth rack 112 on said bar. Shifting of the bar 109 is effected through arms 113 (Figs. 1 and 8) on a horizontal slide rod 115 at the rear of the machine supported in other guides 116 on the machine framework. The selecting slide 106a of the unit 60a is similarly actuated by a bar 109a immediately below the bar 109 and connected by arms 113a with a slide rod 115a, the bar 109a being held against accidental displacement in shifted positions by the detent shown at 111a in Fig. 1. From Fig. 3 it will be observed that the rod 115 is directly connected to a pendent arm 117 attached to the nut 46 of the "pointex" attachment 42. The rod 115a, on the other hand, is arranged for actuation by a depending arm 118 on the nut 47 (Figs. 3 and 24-31) of the "pointex" attachment through the medium of a delay mechanism which includes a slide 119 engaged in a vertical guideway 120 in said arm and which is subject to the upward pull of a spring 121. As shown, the slide 119 has a cross head 122 adjacent its upper end, while at an intermediate point it is narrowed as at 123. To the lower end of the slide 119 is secured a cam piece 125 with bevels at 126 and 127. When the slide 119 is elevated as in Fig. 24, its wide lower end portion snugly engages between a pair of collars 128 on the rod 115a so that movement may be imparted to it during shifts of the nut 47 of the "pointex" attachment. On the other hand, when the slide 119 is lowered as in Fig. 25 with its narrowed portion 123 between the collars 128, shifts of the nut 47 may take place without attendant impartation of movement to the rod 115a for a purpose later on explained. Actuation of the slide 119 is controlled by special buttons 129 on the timing chain 41 (Figs. 2, 3 and 10) which act upon a cam finger 130 fulcrumed on a fixed stud 131. A link rod 132 serves to couple an upward extension of the finger to a lever 133 on a transverse shaft 134 supported in brackets 135 on one of the frames 1 of the machine. Another lever 133x on the shaft 134 is in turn coupled by means of another link rod 136, to one end of a horizontal slide rod 137 engaged in guides 138. The other end of the slide rod 137 is coupled by means of still another link rod 139 (Fig. 3) to an arm 140 on a transverse rock shaft 141 which is journaled in upstanding bracket projections 142 on the frame rail 3 (Figs. 3 and 24). A vertical link 143 connects another arm 144 on the shaft 141 with a lever 145 pivoted to a collar 146 on a rod 147 which is fixedly supported in the framework, said lever having a roller 148 for engaging the cross head 122 of the slide 119. Thus, through the means just described, each time a button 129 on the chain 41 passes beneath the finger 130, the slide 119 is depressed against the action of the spring 121 to the position shown in Fig. 25. Upon being depressed as just explained, the slide 119 is temporarily locked by a detent 150 pivoted on the projection 118 and drawn laterally by a spring 151 from the position shown in Fig. 24 to that shown in dotted lines in Fig. 25 and in full lines in Fig. 26 to engage over the top edge of the cam piece 125 on said slide. Pivoted on a bracket projection 152 of the horizontal link 30 of the coulier motion is a dog 153 which is adapted to coact with the detent 150 and which is normally held in the upright position in which it is shown in Figs. 24 and 26 with its tail engaging the stop pin 155 by a light spring 156. Also pivotally mounted on the projection 152 of the coulier link 30 is a medially pivoted arm 157 with a roller 158 at one end which is adapted to coact with the bevel 126 of the cam piece 125 and which is normally held in the upright position as shown in Figs. 24 and 26 by a spring 159 with its lower or tail end engaging another stop pin 160 on said projection.

The slide rod 102 is actuated by means shown to the best advantage in Figs. 2 and 10 as comprising a four-armed cam wheel 165 which is rotatively supported by a bracket 166 on a supplemental longitudinal frame beam 167. By cooperation with a roller 168 on a collar 169 secured to the rod 102, the latter is shifted leftward in Fig. 2 in opposition to a spring 170 in compression between said collar and one of the guide bearings 103 for said rod. The star wheel 165 is rotated through a quadrant during each knitting cycle as a consequence of the picking of an associated ratchet wheel 171 by a pawl 172 which at the outer end of a spring-pulled arm 173 which is fulcrumed on the shaft 92 previously referred to. At a medial point the arm 173 carries a roller 175 in the plane of a rotary cam 176 on the cam shaft 16. Normally when the roller 168 is engaged in one of the notches in the cam wheel 165, the arm 173 is supported in raised or idle position by a spring-influenced trigger 177 which engages beneath its outer end, said trigger being pivoted on a post bracket 178 upstanding from the front beam 2 of the machine framework. The lower or tail end of the trigger 177 is coupled by means of a link rod 179 to the upward arm 180 of a finger 181 which is pivoted for independent movement on the stud 131 alongside the finger 130 and which is operable by buttons 182 on the timing chain 41 there being two such buttons.

Affixed to the rod 102 (Figs. 6 and 12) is a forked arm 183 for shifting the roller 25 on its stud 23, and mounted on said stud is an auxiliary non-shiftable roller 25a which is adapted to cooperate with a special press cam 184 secured to cam shaft 16 alongside the cam 19. The main rise of this special cam 184 is lower than that of the regular press cam 18 so that during heel knitting the needle beards do not reach to the presser ledge 17. During ordinary knitting on the other hand, the special cam 184 will not interfere with the regular actuation of the press mechanism and hence the roller 25a may always be maintained in operative relation thereto. Centrally fulcrumed at 185 (Figs. 1, 5 and 11) on the bearing bracket 186 bridged between the frame rails 2 and 3 is a lever 187 whereof one end engages between a pair of collars 188 on the control rod 102 and whereof the other end engages between a pair of similar collars 189 on a slide rod 190 at the rear of the machine, the latter rod being provided with a forked lever 191 (Figs. 7 and 13) for shifting a roller 192 on the stud 41 carrying the roller 40 and which during the heel knitting cooperates with a special cam 193 connected to the cams 35 and 36 on cam shaft 16 during heel knitting.

In order to prevent gathering of the fabric of the heel and fouling of the same by the needles during their formation, I have notched the knock-overs 12 as at 12x, see Figs. 32 and 33, and provided mechanism for imparting lateral movements to said knock-overs to positively push said fabric away from the needles each time new loops are formed. For the description of this mechanism reference will be had to Figs. 1, 5, 9, 15, 17, 18, 19, 21 and 22. As shown, the knock-over bar 15 is restricted through engagement of the pendent extremities 200 of its supporting yoke 201 between guides 202 on the center bed 5 of the machine. In accordance with my invention, the knock-over bar 15 is normally held in contact with the front face of the bed 5 by balls 203 (Figs. 16 and 17), said balls being pressed by finger springs 205 and confined in apertures in guard plates 206 which are secured to the guides 202 and which overlap the side portions of the knock-over bar supporting yoke 201. Slidable in a pair of guides 207 on the center bed 5 centrally between the downward extremities 200 of the yoke 201 is a vertical bar 208 with a wedge-like upper end 209 adapted to cooperate with a bevel 210 at the rear face of the cross bar of the yoke 201. When thrust upward the bar 208 moves the yoke laterally outward relative to the center bed 5 as shown in Fig. 9 to impart the lateral movement to the knock-overs 12. From Fig. 15 it will be noted that the bar 208 is apertured at its lower end for engagement by a finger 211 on a special spring-influenced longitudinal rock shaft 212 which also carries an arm 213 with a roller 215 thereon adapted to cooperate with another rotary cam 216 on the cam shaft 16 as shown in Fig. 9. Up-and-down movements are induced in the knock-over bar 15 as ordinarily by arms 217 on a longitudinal rock shaft 218 which arms underreach adjustable round-ended studs 219 in the lower ends of the side portions 200 of the supporting yoke 201, said studs being yieldingly held to said arms by springs indicated at 220. The shaft 218 is rocked through well known intermediate connections (not shown) by a suitable rotary cam on the cam shaft 16. Since the last described means is of common construction it has not been deemed necessary to illustrate it in the drawings.

The operation of the machine in producing a flat stocking blank such as shown in Fig. 37 is as follows:

The leg and ankle portions of the blank may be fashioned in the usual way with narrowings at $n$ and $n'$ down to the line $a$—$b$—$c$—$d$ which forms the terminus of the ankle portion. Throughout this phase of the knitting, the auxiliary presser elements 61 and 61a of the respective units 60 and 60a all remain in the lowered or inactive positions in which they are illustrated in Figs. 19 and 21 so that the pressing of the needle beards takes place as ordinarily by direct contact with the presser ledge 17, and the selector slides 106 and 106a of said units positioned as indicated in dot-and-dash lines in Fig. 18. At the completion of the leg portion of the blank, the machine is stopped in preparation for the heel knitting, such preparation being effected by setting the carrier rod stop nuts 46, 47, 58 and 59 in readiness for operation, disconnecting the rod for the main yarn carrier 50 from the couliering mechanism and moving it out of the way, and positioning the heel yarn carriers 51 and 52 all as shown in Figs. 35 and 40. In diagrammatic Figs. 40–44, which will be referred to in explaining how the heel cheeks $H$ of the stocking blank are formed from the yarns $y$ and $y'$, the left and right-hand end groups of heel needles are shown as being apportioned respectively into two subdivisions $9b$, $9c$ and $9d$, $9e$, the needles of such subdivisions being conventionally indicated respectively by small open circles and by small line-shaded circles. The open-circle needles of subdivisions $9b$ and $9d$ are employed in the formation of the heel sutures and the shaded-circle needles of subdivisions $9c$ and $9e$ in outwardly widening the heel cheeks, while the central row of instep needles $9a$ (indicated by the small, solid circles) remain idle throughout the heel knitting and temporarily hold the loops L of the main or body yarn Y. With the machine made ready as above set forth, it is restarted to automatically carry out the heel cheek knitting. Immediately upon initiation of the first rotation of the cam shaft 16 the timing chain 41 is racked to move the button 182 (Figs. 2 and 10) past the finger 181, and at the same time to move the first of the buttons 129 past the finger 130. As a consequence of this action, through the intervening linkage with the finger 130, the slide 119 of the delay mechanism is depressed to the position in which it is shown in Fig. 25 and there temporarily locked by the latch 150, while through the link 179 the latch 177 is withdrawn as shown in Figs. 2 and 10. The arm 173 is thus released for actuation by the cam 176 and the ratchet wheel 171 picked by the pawl 172 to turn the star wheel 165 through a quadrant, with attendant shifting of the control rod 102 to the left as one of the arms of said wheel engages the roller 168, also as shown in Fig. 2. Upon passage of the button 182 on the timing chain 41 from beneath the finger 181, the latch 177 is re-positioned by the spring 221 to arrest the roller arm 173 and to thereafter hold it away from the cam 176, the parts just referred to remaining in these positions throughout the heel knitting. Concurrently with shifting of the control rod 102, the rod 199 at the back of the machine is reversely shifted by the medially fulcrumed cross arm 137. As a result, the roller 25 is displaced from the regular cam 18 of the needles press motion so that the supplemental cam 184 can now take over the control, the roller 95 shifted into the plane of the cam 96 of the presser lift motion for actuation thereby, and the roller 192 shifted onto the cam 193 of the catch bar control motion. Due to shifting of the roller 25 as just explained, pressing of the beards of the needles by contact with the presser ledge 17 is prevented during heel knitting by reason of the decreased inward movement now imparted to the needle bar 8 by the supplemental cam 184 as previously pointed out, so that the central group 9a of the instep needles are prevented from casting the loops of the main yarn Y last formed on them. At the beginning of the first rotation of the cam shaft 16 in the heel knitting, the screw spindle 43 of the "pointex" attachment 42 is given a rotative shift whereby the stop nuts 46 and 47 are moved to the right and to the left respectively from the full line to the dotted line positions in Fig. 40. Due to the direct connection of the rod 115 to the stop nut 46 of the "pointex" attachment 42, it is immediately shifted in the same direction (inward) by the distance of two needles. The rod 199 which is in turn connected to the rod 115 by the arm 113, thus shifts the selector bar 106 of the unit 60 by a corresponding amount to the dotted position of Fig. 40. No movement is, however imparted to the rod 115a at this time since the narrow portion of the slide 119 is positioned in the interval between the collars 128 on said rod so that the selector bar 106a of the unit 60a remains in the full-line position of Fig. 40. As couliering takes place rightward in Fig. 41, the carrier 51 is correspondingly moved until intercepted by the stop 46 and feeds its yarn to the first outermost pair of needles 9 of the left-hand suture forming subdivision 9b, the carrier 52 remaining idle by reason of being arrested by the stop 59. At the completion of the rightward couliering stroke, the selector bars 106 and 106a are elevated through the intervening connections from the cam 96 on cam shaft 16, with attendant formation of loops of the yarn y by said pair of needles as the needle bar 8 is operated and casting of a corresponding pair of loops of the main yarn Y as shown in Fig. 41, the rising movement of the slide 106a having no effect except to lift the presser elements associated with the right-hand group of widening needles to which no yarn has been fed. However, immediately upon start of the couliering leftward, the dog 153 on the link 30 of the couliering mechanism displaces the latch 150, whereupon the slide 119 is raised by the combined action of the spring 121 and the roller 158 so that its wide lower portion, by engaging between the collars 128, shifts the rod 115a to effect, through the arms 113a, a corresponding inward shift of the selector bar 106a by a distance of one of the presser bits 61a to the position indicated in full lines in Fig. 42. In their succeeding leftward traverse, the carriers 51 and 52 are arrested by the stops 58 and 47 as in Fig. 42, the carrier 51 feeding its yarn y to the same pair of needles, while the carrier 52 feets its yarn y' to the outer endmost pair of the right-hand subdivision 9d of the suture needles. Upon subsequent elevation of the selector bars 106 and 106a and actuation of the needle bar 8, another pair of loops will be formed from the yarn y at the left-hand edge of the stocking blank and the previous pair cast from the two active needles, concurrently with formation of fabric loops by the outer endmost pair of the right-hand subdivision 9d of suture needles as shown in Fig. 42. Thereupon, the timing chain is again racked with passage of another of the buttons 129 past the finger 130 and resetting of the slide 119 of the delay mechanism in the position of Fig. 25. At the same time the spindles of the "pointex" mechanism 42 and of the narrowing heads are actuated to move the stops 46 and 47 toward each other and to increase the distance between the stops 58 and 59 each by the distance of a pair of needles to the positions in which they are shown in dotted lines in Fig. 42. Thus as the carriers 51 and 52 traverse rightward, the carrier 51 feeds its yarn y to an additional pair of the suture needles inward from the left edge of the blank, while the carrier 52 feeds its yarn to the first pair of needles of the right-hand widening group 9e as in Fig. 43. Upon subsequent elevation of the selector slides 106, 106a loops are formed on the needles to which the yarns y and y' were supplied as just explained. At the beginning of the next couliering stroke leftward, the slide 119 of the delay mechanism is released in the same way as before described and the selector bar 106a moved inward from the position of Fig. 43 to that shown in Fig. 44. Thus at the completion of the leftward traverse of the carriers in Fig. 44, an additional pair of needles of the right-hand suture group 9d inward of the blank edge is supplied with the yarn y', and the innermost pair of needles of the left-hand widening group 9c supplied with the yarn y in addition to the two corresponding suture needles which were served previously. During elevation of the selector bars 106, 106a which immediately follows, the loops originally held by the needles which have just been supplied with the yarns y and y' are cast off as also shown in Fig. 44. If, for example in Fig. 43, the selector bar had been moved inward at the same time with the stop 47 preparatory to the traverse of the carrier 52 toward the right, the loops L of the main yarn on the two suture needles at 9n would have been dropped during the succeeding actuation of the needle bar 8, with consequent formation of a relatively large hole in the fabric. This contingency, it will be seen, I have avoided through provision of the delay mechanism. The foregoing procedure is continued over and over again with progressive addition of pairs of needles inwardly from opposite edges of the stocking blank and with concurrent progressive increases in the outward movement of the carriers 51 and 52 until the line e—b—c—h in Fig. 37 is reached, whereupon the action is reversed to the point of beginning down to the line $g$—$b$—$c$—$i$. At this stage the second of the buttons 182 on the timing chain underpasses the finger 188 to again operate the trigger and release the roller arm 183 for actuation by the cam 176 on cam shaft 16 whereby the star wheel 165 is turned through another quadrant, so that the roller 168 will be urged into one of the depressions of said wheel and the rod 162 shifted rightward in Fig. 2 in the opposite direction to cause the roller 25 to re-engage the cam 18 of the needle press motion, to remove the roller 95 from the cam 96 of the presser element lift motion, and the roller 192 from the cam 193 of the catch bar control motion, the machine being thus restored to normal knitting for the production of the foot portion of the stocking blank which may be accomplished in the usual way. Due to the described method of fashioning, the heel cheeks will assume a substantially square configuration. During the formation of the lower halves of the heel cheeks, narrowing is resorted to at $n^2$ in Figs. 37 and 38 for rounding purposes. This is done in the usual way by employing the narrowing mechanism of the machine which has accordingly been omitted in the drawings. It will be seen that throughout the formation of the heel cheek webs, the notched knock-overs operate to positively work the stitches away from the heel needles as they are being formed thereby preventing accumulation of the heel cheek webs at the needles and from being fouled by them. This action is important to the succeessful production of stockings on my improved machine. Narrowing is also preferably resorted to in the foot portion of the blank adjacent the heel cheeks as indicated at $n^3$.

The alternative type of heel cheek illustrated in Fig. 39 is produced by following the same procedure except in that a few full-width courses are interposed between the lines $e$—$b$ and $c'$—$b'$ for the sake of greater fullness in the heel of the completed stocking.

My invention is not to be considered as limited to the precise details of construction disclosed herein by way of example, since several modifications are possible within the scope of the appended claims without departing from the spirit thereof. For instance, the presser elements may be made single instead of double for capacity to cooperate with individual needles, and the controls regulated to reduce the movement imparted to the selector bars in determining stitch formation by such individual needles. Moreover, separately-actuated screw spindles may be substituted for the single screw spindle of the "pointex" attachment to control the extent of traverse of the heel yarn carriers. As a further variation, the main yarn carrier may, if desired or found convenient, be used to serve as one of the heel yarn carriers in the heel knitting.

Having thus described my invention, I claim:

1. In a straight stocking knitting machine, a series of spring beard needles; a presser ledge; means for normally actuating the needles, as during the knitting of the leg and instep portions of a stocking blank, so that the beards of all of them will engage the presser ledge; auxiliary means for actuating the needles, as during heel cheek knitting, to prevent contact of the beards of the instep needles with the presser ledge; presser elements individually associated with the needles of two groups reserved for heel cheek knitting respectively at opposite ends of the series; means for selecting presser elements in progressively varying numbers during heel cheek knitting; and means for actuating the selected presser elements to effect closure of the beards of the corresponding needles during the heel cheek knitting.

2. In a straight stocking knitting machine, a series of spring beard needles; a presser ledge; means for normally actuating the needles, as during the knitting of the leg and instep portions of a stocking blank, so that the beards of all of them will engage the presser ledge; auxiliary means for actuating the needles, as during heel cheek knitting, to prevent contact of the beards of the instep needles with the presser ledge; presser elements individually associated with the needles of two groups reserved for heel cheek knitting respectively at opposite ends of the series; means for selecting the presser elements in progressively varying numbers during the heel cheek knitting; and means for actuating the selected presser elements for insertion between corresponding needles and the presser ledge to effect closure of the beards of said selected needles during the heel cheek knitting.

3. In a straight stocking knitting machine, a series of spring beard needles; a presser ledge; means for normally actuating the needles, as during the knitting of the leg and instep portions of a stocking blank, so that the beards of all of them will engage the presser ledge; auxiliary means for actuating the needles, as during heel cheek knitting, to prevent contact of the beards of the instep needles with the presser ledge; presser elements associated with the needles of two groups reserved for heel cheek knitting respectively at opposite ends of the series; means for selecting the presser elements in progressively increasing numbers inwardly from corresponding ends of the two groups for a time and later for progressively decreasing them for a time during heel knitting; and means for actuating the selected presser elements to cause closure of the beards of the corresponding needles during the heel knitting.

4. In a straight stocking knitting machine, a series of spring beard needles; a presser ledge; means for normally actuating the needles, as during the knitting of the leg and instep portions of a stocking blank, so that the beards of all of them will engage the presser ledge; auxiliary means for actuating the needles, as during heel knitting to prevent engagement of the beards of the instep needles with the presser ledge; presser elements associated with the needles of two groups reserved for heel cheek knitting respectively at opposite ends of the series; means for selecting the presser elements in progressively increasing numbers inwardly from corresponding ends of the two groups for a time and afterwards decreasing their numbers during heel knitting; and actuating means operative to insert the selected presser elements between the presser ledge and the corresponding needles during the heel knitting.

5. In a straight knitting machine, a series of vertically arranged spring beard needles; a presser ledge; means for normally actuating the needles so that the beards of all of them will engage the presser ledge; auxiliary means for actuating the needles at certain times to prevent contact of their beards with the presser ledge; normally idle presser elements associated with certain of the needles and normally located beneath the presser ledge; a selecting slide horizontally movable beneath the presser bits; means for progressively shifting the slide to select varying numbers of the presser elements for actuation; and means for elevating the slide to move the selected presser elements between the presser ledge and the corresponding needles.

6. A straight stocking knitting machine according to claim 3, in which separate reciprocable yarn carriers supply individual yarns for knitting the respective heel cheeks; in which a stop mechanism variantly limits the traverse of the yarn carriers during the heel knitting; and in which the presser elements selecting means is connected to the yarn carrier stop mechanism for actuation thereby.

7. A straight stocking knitting machine according to claim 3, in which separate reciprocable yarn carriers supply individual yarns for knitting the respective heel cheeks; in which mechanism with screw-actuated stop nuts variously limits the traverse of the carriers during the heel knitting; and in which the means for selecting the presser elements is connected to the stop nuts of said yarn carrier stop mechanism for actuation thereby.

8. A straight stocking knitting machine according to claim 3, in which the needles are vertically arranged; in which the presser elements are normally disposed below the presser ledge; in which separate reciprocable yarn carriers supply individual yarns for knitting the respective heel cheeks; in which mechanism with screw-actuated stop nuts variously limits the traverse of the carriers during the heel knitting; in which the selecting means includes slides arranged beneath the respective groups of presser elements; in which the slides are connected for actuation to the stop nuts of the yarn carrier stop mechanism; and in which the presser actuating means elevates the slides to move the selected presser elements between the presser ledge and the corresponding needles.

9. In a straight knitting machine, a series of spring beard needles; an associated series of normally-retracted presser elements; a traversing carrier for serving yarn to the needles; a selector slide shiftable transversely of the presser elements; means for variantly shifting the slide and concurrently limiting the traverse of the carrier in accordance with the number of the presser elements selected for operation; and means for actuating said slide to move the selected presser elements into cooperative position with the beards of the corresponding needles.

10. In a straight knitting machine, a series of vertically-arranged spring beard needles; an associated normally-retracted vertically-arranged series of presser elements; a horizontally-shiftable selector slide underreaching the presser elements; means for variantly shifting the slide; and means for actuating the slide to move the selected presser elements into cooperative position with the beards of the corresponding needles.

11. In a straight knitting machine, a series of spring beard needles; an associated series of normally-retracted presser elements; a traversing carrier for serving yarn to the needles; a selector slide movable transversely of the presser elements; means for variantly shifting the slide and concurrently limiting the traverse of the carrier in accordance with the number of presser elements selected, said means including a screw spindle with oppositely pitched threads, nuts respectively on said spindle threads to control the traverse of the carrier, and means connecting the selector slide to one of said nuts; and means for actuating said slide to advance the selected presser elements into cooperative position with the beards of the corresponding needles.

12. A knitting machine according to claim 3, further including means operative to work the heel cheek webs away from the heel needles as they are being formed to prevent them from accumulating at and from being fouled by said needles.

13. A knitting machine according to claim 3, further including notched knockovers in individual association with the needles; and means for actuating the knockovers to positively work the fabric loops away from the heel needles and thereby prevent the heel cheek webs from accumulating at said needles and being fouled thereby.

14. A knitting machine according to claim 3, in which the needles are vertically arranged and further including a bar carrying a series of notched knockovers to cooperate with individual needles; means for imparting vertical movements to said knockover bar; and auxiliary means for imparting lateral movements to the knockover bar so that the fabric loops are positively worked away from the heel needles by the knockovers and thereby prevent the heel cheek webs from accumulating at said needles and from being fouled thereby.

15. A knitting machine according to claim 3, in which the needles are vertically arranged and further including a bar carrying a series of notched knockovers to cooperate with individual needles; a vertical guide surface for the knockover bar; yielding means for urging the bar toward said surface; means for imparting vertical movements to the knockover bar; and auxiliary means for concurrently imparting lateral movements to the knockover bar so that the fabric loops are positively worked away from the heel needles by the knockovers and thereby prevented from accumulating at said needles and from being fouled thereby, the last mentioned means comprising a vertically reciprocable wedge member operative between said knockover bar and said guide surface.

16. In a straight stocking knitting machine, a series of spring beard needles; a presser ledge; means for normally actuating the needles as during leg and instep knitting, so that the beards of all of them will engage the presser ledge; auxiliary means for actuating the needles as during heel cheek knitting, to prevent contact of the beards of the needles with the presser ledge; presser elements associated with two end groups of the needles reserved for heel cheek knitting; separate concurrently actuated reciprocating carriers for feeding individual yarns to the heel needles of the respective end groups; means for selecting the presser elements of the two groups first in progressively increasing numbers in one direction for a time and later in progressively decreasing numbers in the opposite direction for a time during the heel knitting, including a pair of selector slides; means for shifting one of the selector slides preparatory to traverse of the carriers in one direction, and for reversely shifting the other selector slide preparatory to traverse of said carriers in the opposite direction; and means for bodily moving the slides during the formation of each course of the heel knitting to actuate the selected presser elements and thereby effect closure of the beards of the corresponding needles.

17. A straight stocking knitting machine according to claim 16, in which the selector slide shifting means includes an intermittently rotated screw spindle which has oppositely-pitched threads and which is operated once for every other course of the heel knitting, a follower nut on one of the spindle threads connected to one of said slides for imparting movement directly thereto preparatory to traverse of the carriers in one direction, a second follower nut on the other spindle thread, and delay means whereby the movement of said second follower nut is communicated to the other of said slides after completion of the traverse of the carriers in said direction and before their traverse in the opposite direction.

18. A straight stocking knitting machine according to claim 16, in which the selector slide shifting means includes an intermittently-rotated screw spindle which has oppositely-pitched threads and which is operated once for every other course of the heel knitting, a follower nut on one of the spindle threads connected to one of said slides for imparting movement directly thereto preparatory to traverse of the carriers in one direction, a second follower nut on the other spindle thread, and delay means whereby the movement of said second follower nut is communicated to the other of said slides after completion of the traverse of the carriers in said direction and before their traverse in the opposite direction, said delay means comprising an endwise shiftable rod whereto said other slide is connected, a normally retracted coupling member carried by said second follower nut having a narrow portion normally positioned between a pair of collars on the rod with provision of side clearance, and a wide portion equal to the collar spacing, and means for operating said member to shift said rod at the proper time.

19. A straight stocking knitting machine according to claim 16, in which the selector slide shifting means includes an intermittently-rotated screw spindle which has oppositely-pitched threads and which is operated once for every other course of the heel knitting, a follower nut on one of the spindle threads connected to one of said slides for imparting movement directly thereto preparatory to traverse of the carriers in one direction, a second follower nut on the other spindle thread, and delay means whereby the movement of said second follower nut is communicated to the other of said slides after completion of the traverse of the carriers in said direction and before their traverse in the opposite direction, said delay means comprising an endwise shiftable rod whereto said other slide is connected, a normally retracted coupling member carried by said second follower nut having a narrow portion normally positioned between a pair of collars on the rod with provision of side clearance, and a wide portion equal to the collar spacing, means operated by a reciprocating element of the machine as it moves in one direction to project the coupling member out as it moves in the opposite direction to retract said member.

JOHANNES PAUL LUDWIG.

REFERENCES CITED

The following references are of record in the file of this patent:

UNITED STATES PATENTS

| Number | Name | Date |
| --- | --- | --- |
| 2,366,340 | Lambach | Jan. 2, 1945 |
| 2,046,072 | Heinitz | June 30, 1936 |
| 2,085,656 | Heinitz | June 29, 1937 |
| 1,782,007 | Le Gorre | Apr. 6, 1928 |
| 2,126,797 | Miller | Aug. 16, 1938 |
| 2,395,908 | Richter | Mar. 5, 1946 |
| 2,009,925 | Heinitz | July 30, 1935 |
| 500,700 | Woodward | July 4, 1893 |

FOREIGN PATENTS

| Number | Country | Date |
| --- | --- | --- |
| 34,780 | Germany | Sept. 12, 1885 |
| 147,093 | Great Britain | July 7, 1920 |